US007852356B2

(12) United States Patent
Takikawa et al.

(10) Patent No.: US 7,852,356 B2
(45) Date of Patent: Dec. 14, 2010

(54) MAGNIFIED DISPLAY APPARATUS AND MAGNIFIED IMAGE CONTROL APPARATUS

(75) Inventors: Erina Takikawa, Nara (JP); Yoko Yoshida, Kyoto (JP); Miharu Sakuragi, Kyoto (JP); Miki Matsuoka, Kyoto (JP)

(73) Assignee: Omron Corporation, Kyoto (JP)

( * ) Notice: Subject to any disclaimer, the term of this patent is extended or adjusted under 35 U.S.C. 154(b) by 1130 days.

(21) Appl. No.: 11/107,732

(22) Filed: Apr. 18, 2005

(65) Prior Publication Data

US 2005/0251015 A1 Nov. 10, 2005

(30) Foreign Application Priority Data

Apr. 23, 2004 (JP) ............................ 2004-128654

(51) Int. Cl.
*G09G 5/00* (2006.01)

(52) U.S. Cl. ...................................... 345/660; 382/298

(58) Field of Classification Search .................. 345/660
See application file for complete search history.

(56) References Cited

U.S. PATENT DOCUMENTS 5,438,357 A 8/1995 McNelley
5,835,641 A * 11/1998 Sotoda et al. ............... 382/291
6,049,674 A 4/2000 Yamamoto et al.
6,124,841 A * 9/2000 Aoyama ..................... 345/636
6,137,469 A * 10/2000 Wu et al. .................... 345/660
6,304,271 B1 * 10/2001 Nehme ....................... 345/620
7,587,068 B1 * 9/2009 Steinberg et al. ............ 382/118
2003/0071908 A1 * 4/2003 Sannoh et al. .............. 348/345
2003/0090497 A1 * 5/2003 Yoshioka .................... 345/660
2003/0103065 A1 * 6/2003 Masera et al. ............... 345/660
2003/0174220 A1 * 9/2003 Ito .......................... 348/240.2

(Continued)

FOREIGN PATENT DOCUMENTS

EP 1 128 316 A1 8/2001

(Continued)

OTHER PUBLICATIONS

Young-Ouk, Kim et al., "Automatic Face Region Tracking for Highly Accurate Face Recognition in Unconstrained Environments", IEEE Conference on Advanced Video and Signal Based Surveillance, Piscataway, NJ, USA, pp. 29-36, Jul. 21-22, 2003.

(Continued)

*Primary Examiner*—Xiao M Wu
*Assistant Examiner*—Maurice McDowell, Jr.
(74) *Attorney, Agent, or Firm*—Dickstein Shapiro LLP

(57) ABSTRACT

To provide an apparatus capable of easily displaying a magnified image of a subject intended for by the user. An intended subject such as the face of a man is detected from the image displayed on the screen, and in accordance with the position and size of the intended subject detected, the display area and the magnification rate for magnified display of the intended subject are determined. In accordance with the display area and the magnification rate thus determined, the magnified display is conducted on the screen. In the case where a plurality of intended subjects exist in the image, the intended subjects are classified into a plurality of masses and the magnified display may be conducted for each mass.

4 Claims, 21 Drawing Sheets

1a
7a
8
2
Imaging unit
Face detector
3
4a
5
Input unit
Control unit
Image storage unit
6
9a
Display unit
Magnified image control unit
Magnified image control apparatus
Imaging apparatus

U.S. PATENT DOCUMENTS

| | | | | |
|---|---|---|---|---|
| 2004/0119852 | A1 * | 6/2004 | Shin | 348/240.2 |
| 2004/0169668 | A1 * | 9/2004 | Yamada et al. | 345/660 |
| 2004/0183819 | A1 * | 9/2004 | Henry | 345/660 |
| 2004/0246272 | A1 * | 12/2004 | Ramian | 345/660 |
| 2005/0041044 | A1 * | 2/2005 | Gannon | 345/660 |
| 2005/0083350 | A1 * | 4/2005 | Battles | 345/660 |
| 2006/0215924 | A1 * | 9/2006 | Steinberg et al. | 382/254 |

FOREIGN PATENT DOCUMENTS

| | | |
|---|---|---|
| JP | 2003-271931 | 9/1926 |
| JP | 09-233384 | 9/1997 |
| JP | 2000-048184 | 2/2000 |
| JP | 2001-045407 | 2/2001 |
| JP | 2003-107335 | 4/2003 |
| JP | 2003-108979 | 4/2003 |

OTHER PUBLICATIONS

English language translation of Japanese Office Action dated Jan. 9, 2009, for corresponding Japanese patent application No. 2004-128654.

English Translation of Japanese Office Action dated Apr. 7, 2009.

* cited by examiner

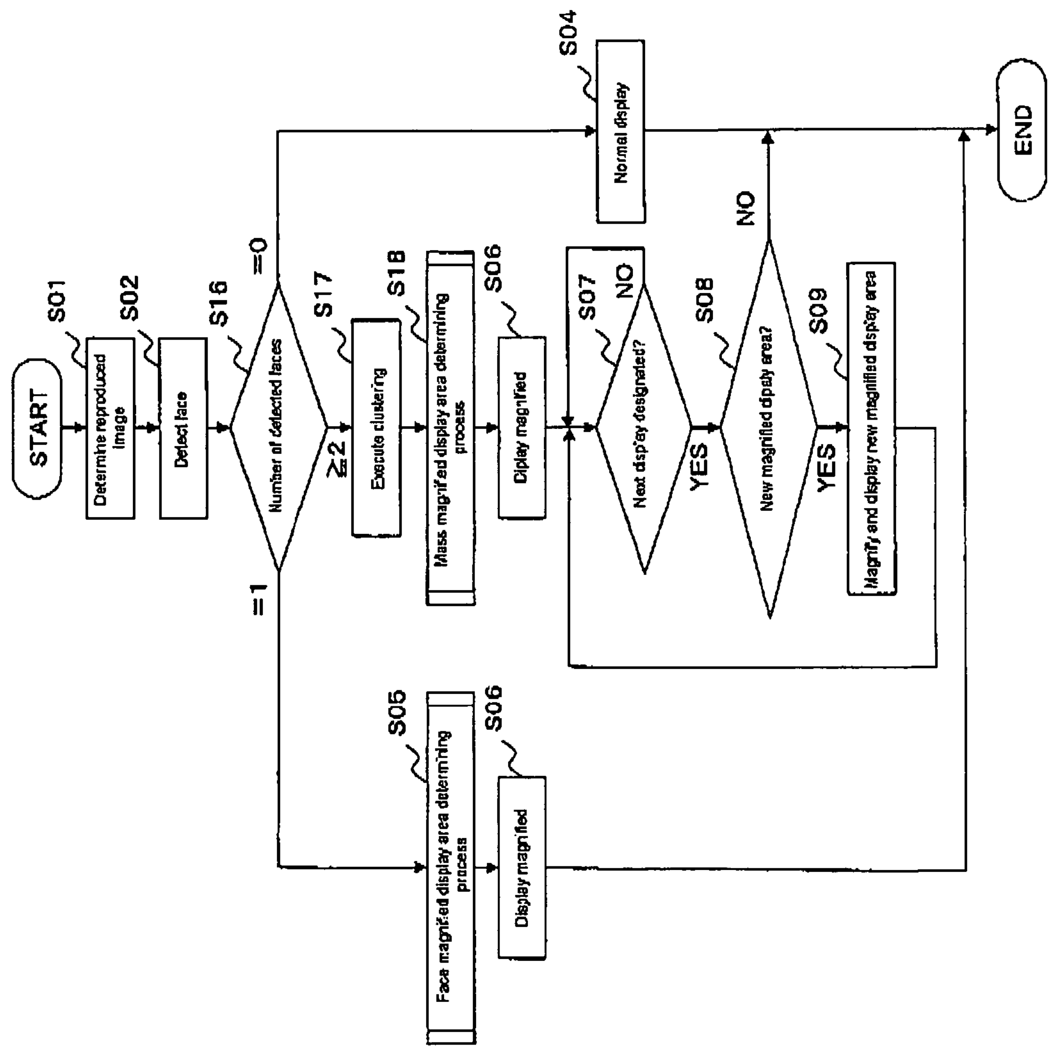

Fig. 16
START
S01
Determine reproduced image
S02
Detect face
S16
Number of detected faces
=0
=1
≧2
S17
Execute clustering
S18
Mass magnified display area determining process
S06
Display magnified
S07
Next display designated?
NO
YES
S08
New magnified display area?
NO
YES
S09
Magnify and display new magnified display area
S04
Normal display
END
S05
Face magnified display area determining process
S06
Display magnified

MAGNIFIED DISPLAY APPARATUS AND MAGNIFIED IMAGE CONTROL APPARATUS

BACKGROUND OF THE INVENTION

1. Field of the Invention

The present invention relates to a technique effectively used for an apparatus (an information processing system, a mobile phone, a portable information processing system, etc.) having the function to display an image.

2. Description of the Related Art

In recent years, the imaging devices such as the digital camera and the apparatuses having the imaging devices (the mobile phone, PDA (personal digital assistant) or other information processing systems) have decreased in size more than ever before. With the decrease in size of these devices, the weight is reduced or otherwise the portability has been improved for the convenience of users. On the other hand, some problems have been posed by the size reduction.

Generally, an imaging device or the like has a display unit, and the user can confirm a picked-up image by displaying it on the display unit. With the reduction in size of the imaging device, however, the display unit has also been reduced in size, thereby making it difficult to confirm the details of the image picked up.

It is true that even with the display unit reduced in size, it has been possible for the user to roughly confirm the pattern, i.e. whether the image of the intended subject is successfully picked up in the image frame or not and whether the whole image is not “whitened” or not. With the conventional display unit reduced in size, however, it is difficult to confirm the details of a part of the image, i.e. whether the image of the intended subject is not blurred by the hand vibration or the intended subject opens the eyes thereof.

In the prior art, in order to solve these problems, a magnified reproduction function has been proposed. In the conventional magnified reproduction function, in response to a user instruction for magnified reproduction, an initially set position (normally, the screen center) is displayed magnified on the display unit at a predetermined magnification rate. By depressing the cursor key or the like, the user can confirm the details of the intended subject by moving the magnified portion within a predetermined range.

Nevertheless, the intended subject is not always imaged at the initially set position. In the case where the intended subject is not displayed magnified in response to the instruction for magnified reproduction, therefore, the user is required to depress the cursor key repeatedly to search for the intended subject from the magnified image. Thus, a great amount of time and labor are required to confirm the image.

To solve this problem, the technique described below is available. In imaging a subject with a digital camera, the position of a marker specifying the image area to be magnified in the whole display area of the display unit is set by a magnified area setting unit and input to an image processing unit. The image processing unit displays the marker at the input position of the display unit and specifies the image area to be magnified. Once the focusing operation is started, the image processing unit reads the whole image data stored in a frame memory and displays it in the whole display area of the display unit. Then, the image data of the image area to be magnified specified by the marker is read, magnified at a predetermined magnification rate, and displayed in the magnified display area of the display unit.

Another technique to solve the problem is available as described below. As long as the shutter button is not depressed, the whole image of a subject picked up by a two-dimensional imaging unit is displayed on a liquid crystal display unit with the resolution of the particular liquid crystal display unit. In the case where the shutter is depressed half way, on the other hand, the image picked up by the two-dimensional imaging unit in the area near the center of the focus area preset by the user is displayed in the magnified display area with a higher resolution. Also, the position of the image in the whole subject displayed in the magnified display area and the resolution of the image displayed in the image magnified display area are changed whenever required in accordance with the user operation. Once the shutter button is fully depressed, the whole image of the subject picked up by the two-dimensional imaging unit with the image-recording resolution is compression coded and recorded in a recording medium.

The imaging device, etc. reduced in size, however, has not any convenient pointing device such as a mouse. The user interface unit of these small-sized devices has never been satisfactory in operability. In the prior art, therefore, it is a bothersome job for the user to designate the position of a display frame (a marker or a magnified display area) indicating the magnified position by operating the user interface unit of the small-sized imaging device, consuming a great amount of time. Also, in the case where the subject intended by the user is different from the subject automatically displayed in magnified form (the subject on which the light is to be focused, for example), or in the case where a plurality of subjects intended by the user exist, the position of the display frame is required to be set each time, thereby posing the problem of consuming a great amount of operation time.

SUMMARY OF THE INVENTION

Accordingly, it is an object of this invention to solve these problems and provide an apparatus in which a magnified image of a subject intended by the user can be easily displayed regardless of whether the subjects to be focused are those intended by the user and the number of the subjects intended by the user.

In order to solve the problems described above, the invention is configured as described below. According to a first aspect of the invention, there is provided a magnified display apparatus comprising a display means to display an image, a detection means to detect an intended subject from the image to be displayed or the image on display on the display means, a display area determining means to determine the display area for magnified display of the intended subject based on the position of the intended subject detected by the detection means, and a magnification rate determining means to determine the magnification rate of the display area based on the determined size of the display area and the size of the screen of the display means. And the display means displays an image in the display area by the display area determining means in accordance with the magnification rate determined by the magnification rate determining means.

An example of the intended subject is the face of a man. In this case, the detection means may be configured as a face detection means to detect the face of a man. Also, the intended subject may be an automobile, a character or another subject as well as the face of a man.

In the magnified display apparatus having this configuration, the image displayed on the screen of the display means assumes not the whole of the image but a magnified image of the intended subject detected by the detection means. In the process, the display area and the magnification rate are determined by the detection means, the display area determining means and the magnification rate determining means. Therefore, the user can confirm the details of the image of the intended subject as compared with the case where the whole image is displayed. Also, the user is not required to determine or perform the operation on the display area and the magnification rate in displaying the magnified image, and therefore the magnified display of the intended subject can be easily viewed.

The magnified display function may be exhibited at the time of picking up an image by the imaging device or at the time of confirming the image picked up. In any case, by magnifying the image of a specified subject, it becomes possible to easily confirm whether the image of the specified subject is focused and the details of the specified subject.

The first aspect of the invention is applicable to devices with the operating units inconvenient to handle (such as a device having a small-sized operating unit, specifically including the mobile phone, the digital camera or the like imaging devices, and the PDA or the like portable information processing terminal devices). In addition to these devices with the operating unit inconvenient to handle, the first aspect of the invention is effectively applicable also to ordinary information processing systems in view of the fact that the user can easily view a magnified display of the intended subject.

Also, the first aspect of the invention may be configured to further comprise a receiving means for receiving an instruction to make a magnified display of the next intended subject included in the intended subjects displayed magnified by the display means. In the case where the instruction is received by the receiving means, the detection means may detect the next intended subject from the intended subjects displayed as a magnified image on the display means, the display area determining means may determine the display area of the next intended subject, the magnification rate determining means may determine the magnification rate of the next intended subject, and the display means may display the next intended subject in the display area newly determined and in accordance with the magnification rate newly determined.

In the first aspect of the invention configured as described above, after a given intended subject is displayed in a magnified form, the next intended subject contained in the particular first intended subject is similarly displayed in magnified form. In the case where the intended subject is the face of a man, for example, the eye(s) (one or both eyes), the nose, the eyebrow, the mouth or the portions surrounding them contained in the face may be displayed in magnified form as the next intended subject. By this configuration, the detailed focusing situation can be confirmed about the image to be picked up or the image that has been picked up. Also, in the case where the intended subject is an automotive vehicle, for example, the driver's seat or the license plate may be displayed as a magnified image of the next intended subject. By this configuration, the crucial information on the vehicle can be easily confirmed.

Also, after the next intended subject is displayed as a magnified image, the second next intended subject may be repeatedly displayed in magnified form. In the case where the surrounding of an eye is displayed in magnified form as the next intended subject, for example, the pupil or the white contained in the eye displayed in magnified form may be displayed in magnified form as the second next intended subject. Also, in the case where the driver's seat and the neighborhood thereof are displayed in magnified form as the next intended subject, the face of the man seated in the driver's seat may be displayed in magnified form as the second next intended subject.

Further, the first aspect of the invention may be so configured as to further comprise a receiving means to receive an instruction to display in magnified form an intended subject different from the one displayed in magnified form on the display means. Once this instruction has been received by the receiving means, the display means may display an image of the intended subject detected by the detection means, in accordance with the display area and the magnification rate providing the result of processing in the display area means and the magnification rate determining means for the intended object not displayed magnified on the display means.

According to the first aspect of the invention having this configuration, in the case where the user is desirous of displaying in magnified form an intended subject different from the one already displayed on the display means, what is required is simply to input a corresponding instruction using the receiving means. The user is not required, therefore, to execute the process of designating the position such as by setting the cursor to a different intended subject or set the magnification rate corresponding to the different intended subject. Thus, the user can easily view the magnified image of the different intended subject than the one displayed on the display means.

The first aspect of the invention may be configured to further comprise a classification means to classify into a plurality of masses a plurality of intended subjects which may be detected by a detection means. In this case, the display area determining means determines the display area based on the positions of all the intended subjects classified into the same mass by the classification means. The classification means is configured to classify the intended subjects, for example, in accordance with the area in the image in which each intended subject is located or the relative positions of the intended subjects. Also, the display area determining means determines the display area in such a manner that all the intended subjects classified into the same mass can be accommodated in the display area.

In the first aspect of the invention configured this way, the plurality of the intended subjects are classified into a plurality of masses, and for each mass, one or more intended subjects are displayed by being magnified at the same time. As a result, the user can view the images of a plurality of the intended subjects at the same time for an improved working efficiency.

Also, the first aspect of the invention may further comprise an evaluation means to display the display area determined by the display area determining means with the magnification rate determined by the magnification rate determining means and evaluate whether the intended subject included in the display area is sufficiently magnified or not, and a reclassification means to classify a plurality of the intended subjects included in the display area further into a plurality of masses. In the case where the intended subjects are classified by the reclassification means, the display area may be determined based on the positions of all the intended subjects classified into the same mass by the reclassification means. In the process, the evaluation as to whether an intended subject is sufficiently magnified or not indicates whether the intended subject which may be displayed in magnified form on the screen of the display means is displayed in a sufficiently large size. The criterion for this evaluation is appropriately set by the designer in accordance with the form in which the magnified display apparatus is mounted.

Assume, for example, that a plurality of intended subjects in a horizontal long string are determined as one mass and the display area is determined as a horizontally long area, and thus the intended subjects located in a wide range are classified into the same mass. In such a case, a small magnification rate may be determined regardless of the size of each intended object, and the image of each intended subject may not be sufficiently magnified and collectively displayed as a small image. The first aspect of the invention configured as described above, however, evaluates whether the magnified display with the magnification rate determined by the magnification rate determining means is sufficient or not, and in the case where the evaluation is that the magnified display is not sufficient, the mass is further reclassified into a plurality of masses. For each of the masses newly reclassified, the display area and the magnification rate are determined anew and the display by magnification is conducted. Even in the images picked up as a horizontally long string which may not be displayed in sufficiently magnified form by simple classification and determination of the magnification rate, therefore, images of the intended subjects can be automatically displayed in sufficiently magnified form.

Also, the display means according to the first aspect of the invention may be configured to display the reduced image of the whole image to be displayed or on display in a part of the screen, while the display area is displayed in magnified form in the other part of the screen. By displaying this way, the user can easily grasp the general configuration as well as each image of the intended subject magnified.

Also, in the display means according to the first aspect of the invention, the position of the intended subject detected by the detection means in the image to be displayed or on display may be displayed in a part of the screen while the display area may be displayed in magnified form in the other part of the screen. The position of the intended subject may be displayed as a geometric figure such as a circle or a polygon. By the display in this manner, the user can grasp the position of each intended subject in the whole image as well as the image of the intended subject magnified, and thus can grasp the pattern thereof. Also, the size of the figure can be changed in accordance with the size of each intended subject.

Also, the display means according to the first aspect may be so configured that the intended subject is displayed in a part of the screen while the display area is displayed in magnified form in the remaining part, where the wording "the display area is displayed in magnified form in the remaining part" indicates not to display the image in this display area but to display the position and/or size of this display area. This is realized, for example, by displaying a frame defining the display area, or by displaying the display area in a color different than the other areas. By this display, the user can easily grasp which part of the image is currently displayed in magnified form.

Also, the display means according to the first aspect may be so configured that the intended subject is displayed in a part of the screen while the intended subjects may be displayed in magnified form in the other areas in a manner discriminable from each other. By this display, the user can grasp which part of the image corresponds to the position of the intended subject currently displayed in magnified form.

Also, the magnification rate determining means according to the first aspect may be configured to determine the magnification rate based on the size of the screen remaining after removing at least a part of the screen. In the case where the display other than the magnified display is made in a part of the screen, the size of the screen for magnified display is reduced. In such a case, if the magnification rate is determined based on the size of the screen itself of the display means, a sufficiently magnified image might not be displayed. According to the first aspect of the invention configured as described above, however, the magnification rate is determined based on the size of the screen excluding the part of the non-magnified display, and therefore the problem described above can be avoided.

Also, the display area determining means according to the first aspect may be configured to change the position of the display area based on the position of a part of the screen in which a reduced image is displayed. In the first aspect of the invention configured in this way, in the case where the display other than the magnified display is made in a lower right part of the screen of the display means, for example, a display area is determined for magnified display with the intended subject shifted leftward of the screen center. In the above-mentioned case, therefore, even in the case where the display other than the magnified display is made in the lower right part of the screen, the magnified image of the intended subject can be displayed without interference from such other display, and therefore the user can confirm the magnified image.

According to a second aspect of the invention, there is provided a magnified image control apparatus comprising a detection means to detect an intended subject from the image to be displayed or on display on the screen, a display area determining means to determine the display area for magnified display of the intended subject based on the position of the intended subject detected by the detection means, a magnification rate determining means to determine the magnification rate of the display area based on the size of the display area determined and the size of the screen, and an output means to output the display area and the magnification rate determined by the display area determining means and the magnification rate determining means, respectively.

The second aspect of the invention further comprises a classification means to classify a plurality of intended subjects detected into a plurality of masses in the case where the plurality of the intended subjects are detected by a detection means, wherein the display area determining means may be configured to determine the display area based on the positions of all the intended subjects classified into the same mass by the classification means.

Also, the second aspect of the invention further comprises an evaluation means to evaluate whether the intended subject included in the display area is displayed in a sufficiently magnified form by displaying the display area determined by the display area determining means on the screen with the magnification rate determined by the magnification rate determining means, and a reclassification means to classify the plurality of the intended subjects included in the display area into a plurality of masses in the case where the evaluation means evaluates that the intended subjects are not sufficiently magnified, wherein the display area may be determined based on the positions of all the intended subjects which may classified into the same mass by the reclassification means in the case where the classification is made by the reclassification means.

Also, the magnified image control apparatus according to the second aspect of the invention may be implemented by a device included in a portable information processing terminal, an ordinary information processing system and an information processing system connected to a network. The magnified image control apparatus implemented by the information processing system connected to the network may be configured to be supplied with the image information from an imaging unit or an image storage server on the same network, while at the same time detecting an intended subject from the image and distributing the result to the display unit or the display terminal on the network.

The first and second aspects may be implemented by the information processing system executing a program. Specifically, according to this invention, the process executed by each means of the first and second aspects described above can be specified as a program for execution by the information processing system or as a recording medium for recording the program. Also, according to this invention, the process executed by each means described above may be specified by the method executed by the information processing system.

According to this invention, the image of an intended subject is displayed by automatic magnification, and therefore the user can view a magnified image easily without the operation to set the display area and the magnification rate.

BRIEF DESCRIPTION OF THE DRAWINGS

FIG. 16 shows a flowchart of an example of operation of the imaging apparatus according to the second embodiment.

DESCRIPTION OF THE PREFFERRED EMBODIMENTS

In the description that follows, the face image is defined as an image including at least a part or the whole of the image of the face of a man. The face image, therefore, may include the image of the whole body or only the face or the upper half of the body of a man. Also, the face image may include an image of a plurality of men. Further, the face image may include any pattern such as a landscape (background including any substance intended as a subject) other than the man as a background.

Embodiment 1

[System Configuration]

Figure 1:
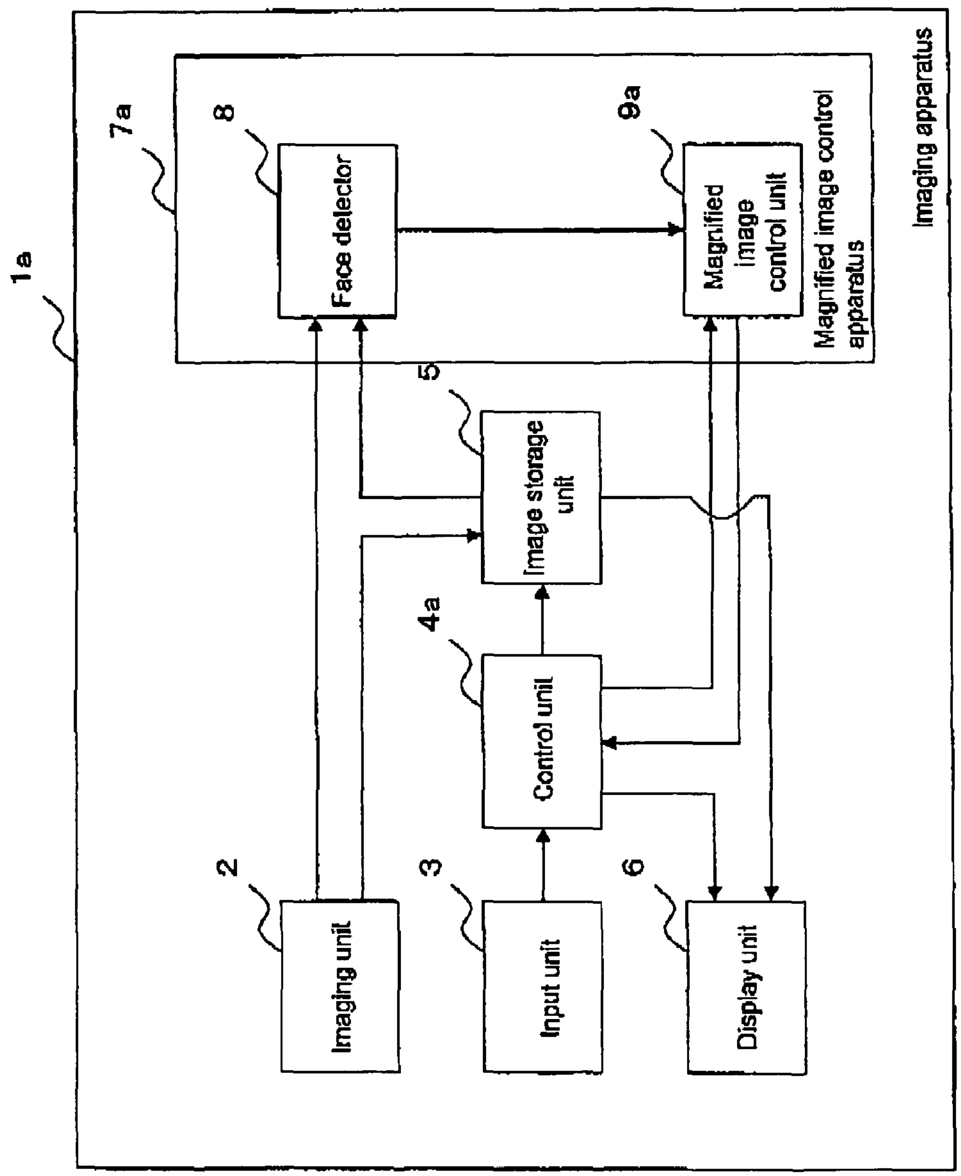
FIG. 1 shows an example of function blocks of an imaging apparatus according to a first embodiment.

First, an imaging apparatus 1*a* having a magnified image control apparatus 7*a* constituting a magnified image control apparatus 7 according to a first embodiment is explained. FIG. 1 is a diagram showing an example of the function blocks of the imaging apparatus 1*a*. The imaging apparatus 1*a* is configured using an imaging device such as a digital still camera or a digital video camera. The imaging apparatus 1*a* may be included in an information processing system or the like (such as a FDA (personal digital assistant) or a mobile phone).

The imaging apparatus 1*a*, in terms of hardware, includes a CPU (central processing unit), a main storage unit (RAM) and an auxiliary storage unit connected through a bus. The auxiliary storage unit is configured of a nonvolatile memory. The term "nonvolatile memory" as used herein includes what is called the ROM (read-only memory) (including the EPROM (erasable programmable read-only memory), the EEPROM (electrically erasable programmable read-only memory) and the mask ROM), the FRAM (ferroelectric RAM) and the hard disk.

The imaging apparatus 1*a* functions as an apparatus including an imaging unit 2, an input unit 3, a control unit 4*a*, an image storage unit 5, a display unit 6 and a magnified image control apparatus 7*a*, in which the various programs (OS, applications, etc.) stored in the auxiliary storage unit are loaded to the main storage unit and executed by the CPU. Next, each function and device included in the imaging apparatus 1*a* are explained.

<Imaging Unit>

The imaging unit 2, to pick up an image, converts the optical signal input through a lens or the like into an electrical signal and acquires the image data. The imaging unit 2 is configured of, say, a CCD (charge-coupled device) or a CMOS (complementary metal-oxide semiconductor) sensor. The imaging unit 2 picks an image in response to an imaging instruction input by the user operating a button not shown. The imaging unit 2, upon picking up an image, delivers the acquired image data to the magnified image control apparatus 7*a* and the image storage unit 5.

<Input Unit>

The input unit 3 is configured as a user interface unit used by the user to input an instruction to the imaging apparatus 1*a*. The input unit 3 is configured of, for example, a pointing device (mouse, track ball, etc.), a touch panel, a keyboard, a button or a dial. Also, the input unit 3 may be configured to input an instruction by recognizing the user's voice using a voice recognition device or another sensor.

The input unit 3, upon receipt of an instruction from the user, delivers the contents of the input instruction to the control unit 4*a*.

<Control Unit>

The control unit 4*a* controls the operation of each functional unit of the imaging apparatus 1*a*. A specific example of the process executed by the control unit 4*a* is explained below.

Once an image reproduced on the display unit 6 is determined, the control unit 4*a* controls the image storage unit 5, the display unit 6 and the magnified image control apparatus 7*a*. The image reproduced in the display unit 6 is determined, for example, in the case where an image is picked up by the imaging unit 2 or an image is selected by the user through the input unit 3. In the case where an image is picked up by the imaging unit 2, it is determined that the image picked up by the imaging unit 2 is displayed oh the display unit 6. In the case where an arbitrary image is selected by the user from the images stored in the image storage unit 5, on the other hand, it is determined that the selected image is displayed on the display unit 6. The operation of the control unit 4*a* is explained below with reference to a case in which an image is picked up by the imaging unit 2.

In the case where an image is picked up by the imaging unit 2, the control unit 4*a* instructs the magnified image control apparatus 7*a* to output the magnified display area and the magnification rate for the image data picked up. The control unit 4*a* receives the values of the magnified display area and the magnification rate as a set from the magnified image control apparatus 7*a*. Also, the control unit 4*a* instructs the display unit 6 to display the data of the image picked up, in accordance with the output of the magnified image control apparatus 7*a*. Then, the control unit 4*a*, in accordance with the user input through the input unit 3, instructs the image storage unit 5 to store or not to store the data of the image picked up.

The control unit 4*a*, upon receipt of a plurality of magnified display areas and magnification rates from the magnified image control apparatus 7*a*, stores their values in a storage unit not shown. The control unit 4*a*, upon receipt of an instruction to display the image of a new magnified display area from the user, selects a magnified display area and a magnification rate stored and not displayed in the display unit 6, and in accordance with the selected values, gives a display instruction to the display unit 6. In the case where the priority order is set to the magnified display areas, the control unit 4*a* may determine the order of display in accordance with the order of priority. Also, the control unit 4*a* may be configured, upon receipt of an instruction from the user to display an image of a new magnified display area, upon completion of display of all the magnified display areas in store, to output an error or to display again the magnified display area already displayed The control unit 4*a* performs various other control operations for the imaging apparatus 1*a* to operate as an imaging device.

<Image Storage Unit>

The image storage unit 5 is configured using what is called a nonvolatile memory. The image storage unit 5 receives an image picked up by the imaging unit 2, and upon receipt of a storage instruction from the control unit 4*a*, stores the image. Also, upon receipt of an instruction to output the image designated by the control unit 4*a*, the image storage unit 5 delivers the designated image to the display unit 6.

<Display Unit>

The display unit 6 is configured using an image display device such as a liquid crystal display. The display unit 6 receives the image data stored in the image storage unit 5, and in accordance with an instruction from the control unit 4*a*, displays the image. Upon receipt of an instruction from the control unit 4*a* to display an image in accordance with the output of the magnified image control apparatus 7*a*, the image is displayed in accordance with the contents output from the magnified image control apparatus 7*a*. Specifically, the display unit 6 deforms and displays, at the magnification rate output from the magnified image control apparatus 7*a*, the image of the magnified display area output from the magnified image control apparatus 7*a* out of the image data read from the image storage unit 5.

<Magnified Image Control Apparatus>

The magnified image control apparatus 7*a* is implemented as a device including the face detector 8 and the magnified image control unit 9*a* in which the program is executed by the CPU included in the imaging apparatus 1*a*. Also, the magnified image control apparatus 7*a* includes a storage unit such as a RAM and a CPU independent of the imaging apparatus 1*a*, and may be implemented as a device having each of the above-mentioned functions by the CPU executing the program. Also, the magnified image control apparatus 7*a* or each of the function units thereof may be constituted as a dedicated chip. Each of the function units included in the magnified image control apparatus 7*a* is explained below.

<<Face Detector>>

The face detector 8 detects the face of a man from the image (hereinafter referred to as "the original image") input to the magnified image control apparatus 7*a*. The face detector 8 detects the face of a man from the original image, and specifies the face coordinate indicating the position and size of the face detected. The face detector 8 may be configured, for example, to detect the face of a man by template matching using a reference template corresponding to the contour of the whole face. Also, the face detector 8 may be configured to detect the face by template matching based on the organs (eyes, pupils, nose, nostrils, mouth, lips, ears, etc.) of the face. Also, the face detector 8 may be configured to detect an apex such as the head by chroma key processing and detect the face based on the apex. Also, the face detector 8 may be configured to detect an area near the skin color and detect the particular area as a face. Also, the face detector 8 may be configured to learn from a teacher signal using a neural network and detect a face-like area as a face. Also, the face detecting process by the face detector 8 may be realized by application of any other existing techniques.

Also, the face detector 8 detects the information required for the magnified image control unit 9*a* such as the position of each of a plurality of organs included in the face detected. In the description that follows, the magnified image control unit 9*a* executes the process using the center position of the eyes and the mouth, and therefore the face detector 8 is configured to detect the center position of at least the eyes and the mouth. Also, the face detector 8 may be configured to further detect the size or direction of the face.

The face detector 8 delivers the detected information on each face (position, size and direction of the face, and the position of each organ, hereinafter referred to as "the face information") to the magnified image control unit 9*a*.

<<Magnified Image Control Unit>>

The magnified image control unit 9*a* generates the information (such as the magnified display area and the magnification rate) for magnifying and displaying the face detected by the face detector 8 on the display unit 6. First, the magnified image control unit 9*a* acquires a face rectangular area constituting an area surrounding an arbitrary face detected by the face detector 8. In the process, the magnified image control unit 9*a* determines the face rectangular area in accordance with the size of the face area, the size of the face organs and the distance between the organs. Also, the face rectangular area is preferably set in a manner not to cross the face contour. Next, the magnified image control unit 9*a* determines a magnified display area based on the face rectangular area. The magnified display area is defined as an area in the original image magnified and displayed by the display unit 6. In the process, the magnified image control unit 9*a* may determine the face rectangular area directly as a magnified display area or may determine the final magnified display area in accordance with the tilt of the face. The magnified image control unit 9$a$ determines the magnification rate for magnifying the image of the magnified display area in accordance with the size of the magnified display area and the size of the display unit 6 determined. A specific example of the process executed by the magnified image control unit 9$a$ is explained below.

Figure 2:
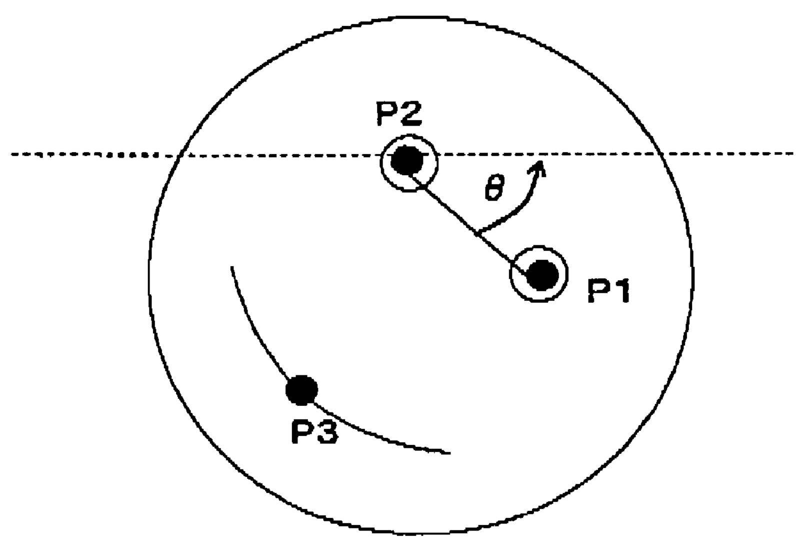
FIG. 2 shows a method to acquire the tilt of a face image.

First, the magnified image control unit 9$a$ acquires the tilt of the face image detected by the face detector 8. FIG. 2 is a diagram showing a method of acquiring the tilt of the face image. The magnified image control unit 9$a$ acquires the angle θ between the line connecting the positions (P1, P2) of the left and right eyes detected by the face detector 8 and the abscissa (horizontal line) of the original image. Then, the magnified image control unit 9$a$ rotates the face image in accordance with the angle θ acquired, and thus acquires a face image with the left and right eyes in horizontal relative positions.

Figure 3:
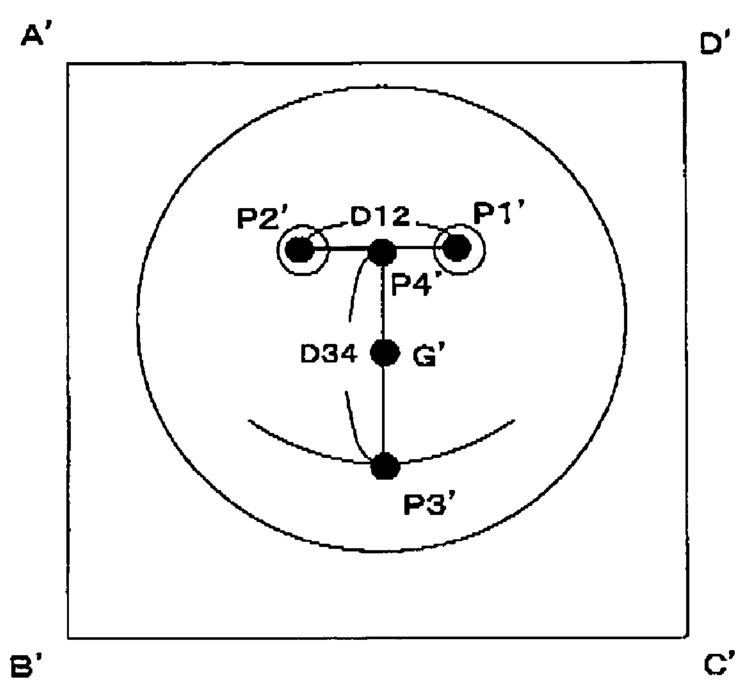
FIG. 3 shows an example of the face image after being rotated so that the tilted face becomes horizontal.

FIG. 3 is a diagram showing an example of the face image after rotation. The magnified image control unit 9$a$ acquires the positions (P1', P2') of the left and right eyes and the center position (P3') of the mouth in the face image after rotation. Next, the magnified image control unit 9$a$ acquires the position of the center of gravity (G') of P1', P2' and P3' as the center of the face image. The coordinate of G' can be acquired by the equation of Expression 1.

$$G'=(P1'+P2'+P3')/3 \quad \text{[Expression 1]}$$

Also, the magnified image control unit 9$a$ acquires the position of the middle point (P4') between P1' and P2'. Then, the magnified image control unit 9$a$ acquires the distance (D12) between P1' and P2' and the distance (D34) between P3' and P4'.

Next, the magnified image control unit 9$a$ determines the face rectangular area (A'B'C'D') based on D12 and D34. The face rectangular area is a rectangle surrounding the face detected and may be arranged at any angle with respect to the original image. The magnified image control unit 9$a$ acquires the four coordinates A', B', C', D' from the equation of Expression 2 and determines the face rectangular area. Incidentally, in Expression 2, Gx and Gy designate the values of the X and Y coordinates, respectively, of the center of gravity G.

$$A'=(G_x-D12\times\alpha/2, G_y-D34\times\beta/2)$$

$$B'=(G_x-D12\times\alpha/2, G_y+D34\times\beta/2)$$

$$C'=(G_x+D12\times\alpha/2, G_y-D34\times\beta/2)$$

$$D'=(G_x+D12\times\alpha/2, G_y+D34\times\beta/2) \quad \text{[Expression 2]}$$

Figure 4:
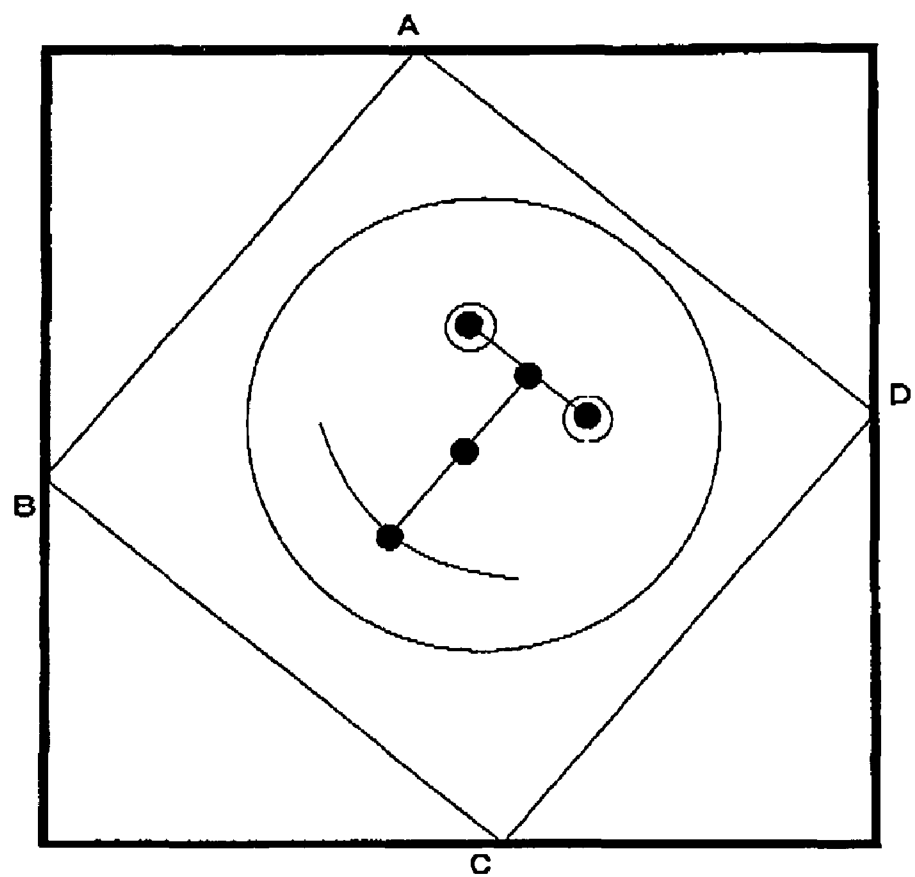
FIG. 4 shows an example of the magnified display area.

In Expression 2, α and β are values appropriately determined by the designer in such a manner that the line segments included in the rectangle A'B'C'D' may not cross the face area. Next, the magnified image control unit 9$a$ rotates the four points in the direction reverse to the direction of the first rotation, and thereby acquires the positions of the four points (A, B, C, D) of the original image before rotation while at the same time determining the magnified display area. FIG. 4 is a diagram showing an example of the magnified display area. The magnified image control area 9$a$ determines a rectangle (rectangle indicated by thick line) constituting the magnified display area based on the four points (A, B, C, D). For example, the magnified image control unit 9$a$ may determine, as a magnified display area, a rectangle defined by lines parallel to x and y axes of the input image (lines parallel and perpendicular to the input image) and passing through the four points (A, B, C, D). Also, the magnified image control unit 9$a$ may determine a magnified display area using, for example, a figure circumscribed about the four points (A, B, C, D).

Next, the magnified image control unit 9$a$ determines the magnification rate for magnifying and displaying the image of the magnified display area. The magnified image control unit 9$a$ determines, based on the size of the magnified display area thus determined, the magnification rate so that the whole of the magnified display area can be displayed on the display area 6. Further, the magnified image control unit 9$a$ may determine the magnification rate in such a manner that the magnification rates in vertical and horizontal directions may not be different from each other (in such a manner that the image after magnification may not be distorted). For example, the magnified image control unit 9$a$ calculates Wd/W and Hd/H using the width W and the height H of the magnified display area and the width Wd and the height Hd of the predetermined display area of the display unit 6, and may determine Wd/W or Hd/H, whichever smaller, as a magnification rate. Then, the magnified image control unit 9$a$ outputs the magnified display area and the magnification rate to the control unit 4$a$. The magnified image control unit 9$a$ determines the magnified display area and the magnification rate for each of all the faces detected and outputs them as a set to the control unit 4$a$.

[Operation Example]

Figure 5:
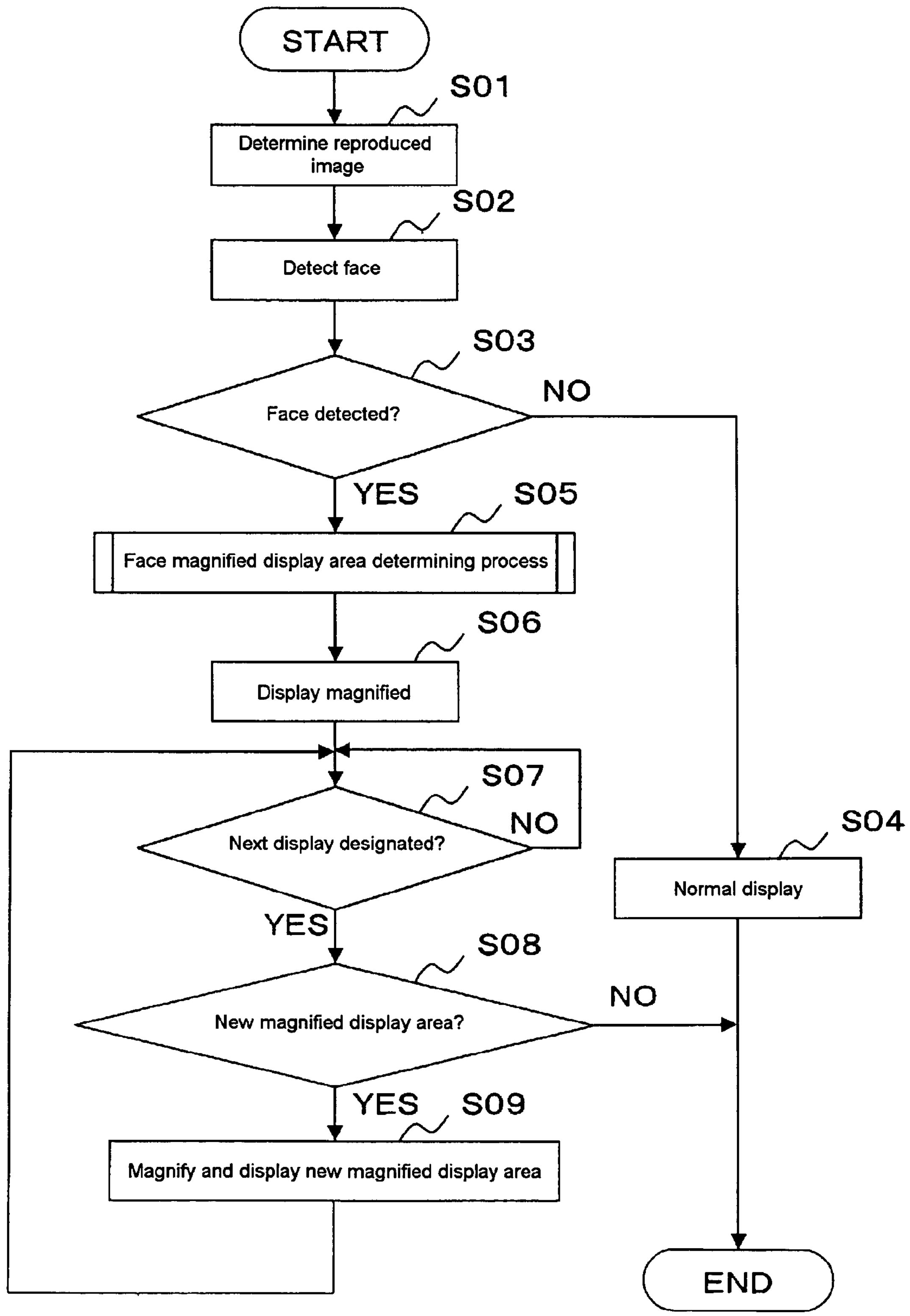
FIG. 5 shows a flowchart of an operation example of an imaging apparatus according to the first embodiment.

FIG. 5 is a flowchart showing an example of operation of the imaging apparatus 1$a$. Once the image to be reproduced and displayed on the display unit 6 is determined (S01), the image data thus determined is delivered to the magnified image control apparatus 7$a$. Some examples of the image reproduced and displayed include an image picked up by the imaging unit 2 and controlled for display on the display unit 6 to allow the user to select whether it is stored in the image storage unit 5 or not, and an image already stored in the image storage unit 5 and selected by the user for display on the display unit 6.

Once the image data is input to the magnified image control apparatus 7$a$, the face detector 8 detects the image of the face of a man from the original image data (S02). In the case where no face of a man is detected (NO at S03), the magnified image control apparatus 7$a$ notifies the display unit 6, which thus ends the process by normal display (S04). The normal display is defined to display the whole image. In the case where the face of a man is detected (YES at S03), on the other hand, the face detector 8 further detects the center of the eyes and the center of the mouth. Then, the magnified image control unit 9$a$ executes the process of determining a face magnified display area (S05). The process of determining the face magnified display area is explained below.

Figure 6:
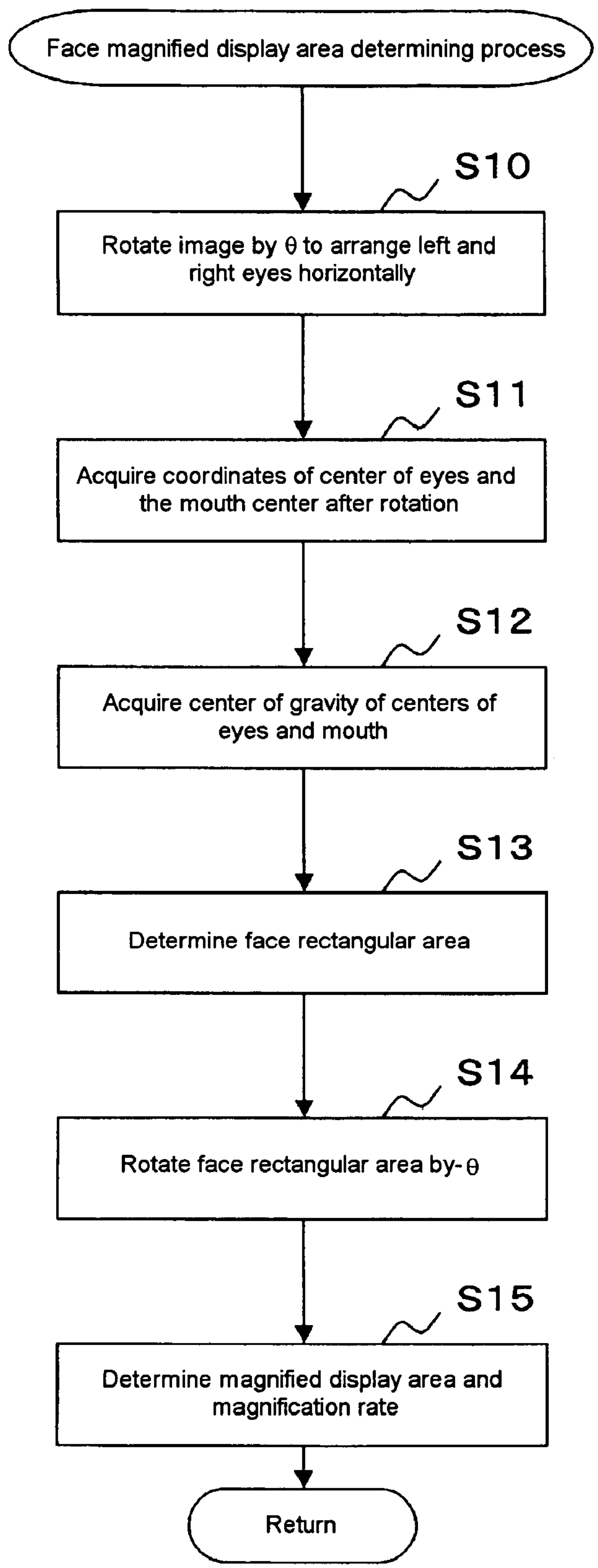
FIG. 6 shows a flowchart of an operation example of the process of determining the face magnified display area.

FIG. 6 is a flowchart showing an example of the process of determining the face magnified display area. First, the magnified image control unit 9$a$ rotates the image by angle θ to arrange the left and right eyes horizontally (S10). Next, the magnified image control unit 9$a$ acquires the coordinates of the center of the eyes and the center of the mouth after rotation (S11), and thus acquires the center of gravity of the particular three points (S12). The magnified image control unit 9$a$ determines the face rectangular area based on the center of the gravity and the positions of the three points after rotation (S13). Next, the magnified image control unit 9$a$ rotates the face rectangular area thus determined by angle θ (S14). The magnified image control unit 9$a$ then determines the magnified display area and the magnification rate based on the face rectangular area after rotation by θ (S15).

Returning to FIG. 5, the process after determining the face magnified display area is explained. The magnified image control apparatus 7*a* outputs the magnified display area and the magnification rate thus determined to the control unit 4*a*. The control unit 4*a* notifies the magnified display area and the magnification rate to the display unit 6, and instructs the display unit 6 to magnify and display the image in accordance with the contents of the instruction. The display unit 6, in accordance with the contents of this instruction, magnifies and displays the image (S06). After that, the control unit 4*a* stands by until an input is received notifying the display of a new magnified display area from the user (NO at S07). Once this input is applied from the user (YES at S07), the control unit 4*a* determines whether a new magnified display area not displayed exists or not. In the absence of a new magnified display area (NO at S08), the process is ended. In the presence of a new magnified display area (YES at SOB), on the other hand, the control unit 4*a* notifies the new magnified display area and the magnification rate to the display unit 6 and instructs the display unit 6 to magnify and display the image in accordance with these values. The display unit 6, in response to this instruction, magnifies and displays the image. After that, the process of and after S07 is executed again.

[Operation/Effects]

Figure 7A:
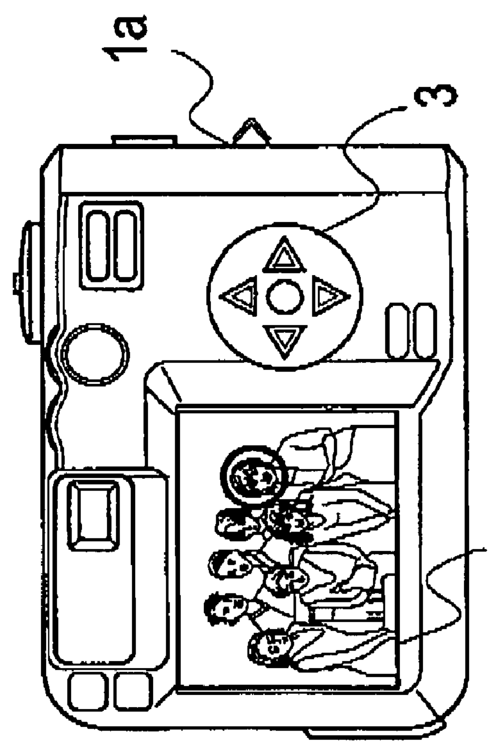
FIG. 7 shows a diagram for explaining the effects of the imaging apparatus according to the first embodiment.
Figure 7C:
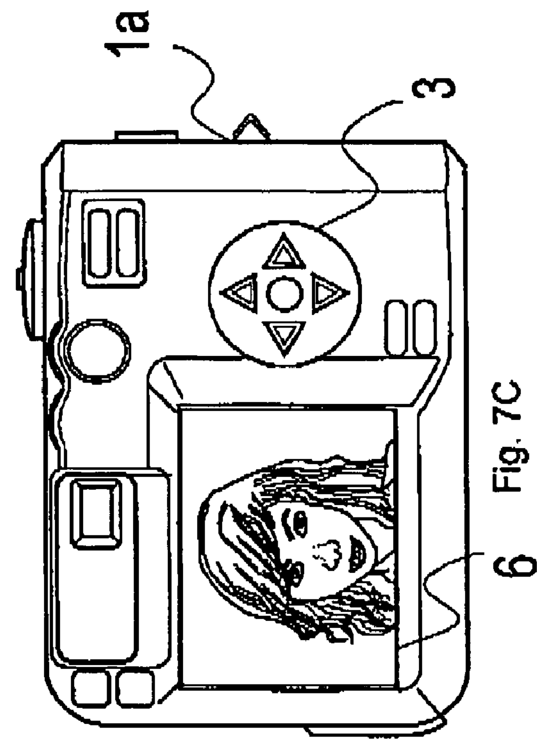
Figure 7B:
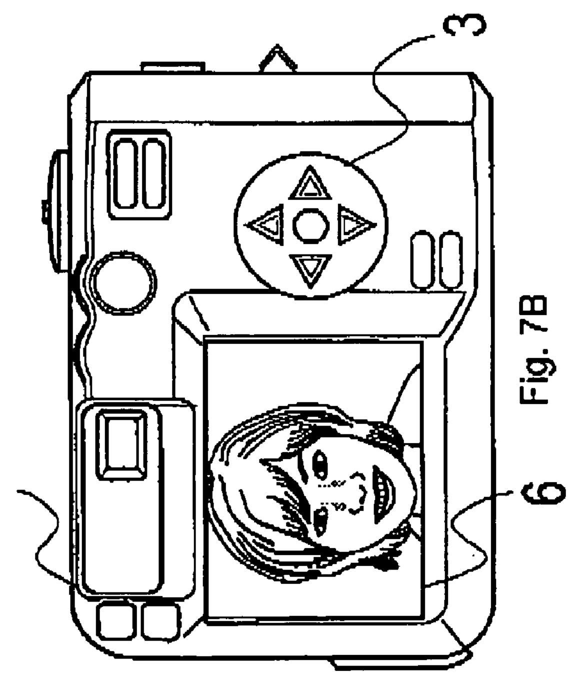

FIG. 7 is a diagram for explaining the effects of the imaging apparatus 1*a*. In the case where an image is displayed in the display unit 6 of the imaging apparatus 1*a*, the magnified image control apparatus 7*a* determines whether the image of a man is included in the image displayed. In the case where such an image is so included, the magnified image control apparatus 7*a* determines the magnified display area as a display area to display the face of the man, and also determines such a magnification rate that the particular area is not displaced out of the frame (screen) of the display unit 6. Then, the display unit 6 magnifies and displays the face area in accordance with the determination of the magnified image control apparatus 7*a*. In the case where the face of a man is included in the image displayed in the display unit 6 as shown in FIG. 7A, therefore, the image of the face of the man is magnified and displayed at an appropriate magnification rate as shown in FIG. 7B without the designating the area and the magnification rate of the face of the man on the part of the user. Thus, the user can easily confirm a magnified image of the face of the man as an intended subject.

Also, in the case where the user inputs an instruction through the input unit 3 to display a new face not displayed in the display unit 6, the image of the new face as shown in FIG. 7C is magnified and displayed. In the case where the user is desirous of magnifying and displaying a new face different from the face on display, therefore, the image of the new face can be easily magnified and displayed without any job of looking for the position of the new face by moving the display frame. At the same time, even in the case where the newly displayed face is different in size from the face on display, the magnification rate is determined by the magnified image control unit 7*a* in accordance with the size of the face newly displayed, and the face is displayed in the display unit 6. Therefore, the user can easily confirm the image magnified at an appropriate magnification rate without determining the magnification rate for the newly displayed image.

[Modification]

Figure 8:
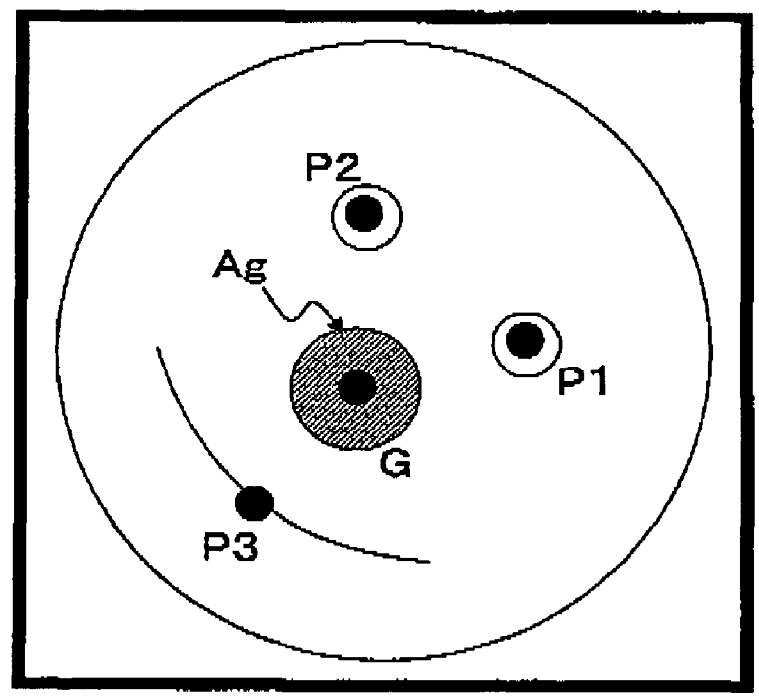
FIG. 8 shows a modification of that process of the imaging apparatus according to the first embodiment which determines the magnified display area.

The magnified image control unit 9*a* may determine a magnified display area through other processes. FIG. 8 is a diagram for explaining an example of another process by the magnified image control unit 9*a*. First, the magnified image control unit 9*a* determines the position of the center of gravity of three points P1, P2, P3. Next, the magnified image control unit 9*a* specifies the skin color of the face to be processed, based on the value of the pixels in the neighborhood of the center of gravity G (for example, the pixels in the circular area Ag (hatched in FIG. 8) specified by the radius of a predetermined size with G as a center). Next, the magnified image control unit 9*a* specifies an area having this skin color or a color near thereto as a skin color area. Incidentally, the skin color is specified based on a color space such as the lab color space. Then, the magnified display area is determined in such a manner that the proportion of the skin color area which represents of the magnified display area assumes a predetermined value. Let W be the width of the magnified display area, H the height thereof and S the size of the skin color area. Then, for predetermined values α and β, W and H may be acquired in such a manner as to hold the relation $$\alpha < S/(W \times H) < \beta \quad \text{[Expression 3]}$$

In the process, W and H may be acquired by predetermining the ratio between W and H.

Also, the magnified image control unit 9*a* may be so configured that in the case where the face detector 8 uses a rectangle indicating the face area to detect the face, this rectangle used for detection may be used as a rectangle indicating the face rectangular area.

Also, the magnified image control unit 9*a* may be configured to acquire the magnification rate in such a manner that the vertical magnification rate and the horizontal magnification rate are different from each other.

Also, in the case where a part of the image stored in the image storage unit 5 is displayed in magnified form, the image conversion such as magnification may be conducted by any of the display unit 6, the magnified image control apparatus 7*a* and another image converter not shown.

Also, the image storage unit 5 is not necessarily required to store only the image picked up by the imaging unit 2 of the imaging apparatus 1*a*, but may be configured to store the image generated by other devices.

Also, the magnified image control unit 9*a* may be configured to assign the order of priority in which a plurality of magnified display areas and magnification rates output are displayed. The order of priority of display (i.e. the order in which something is displayed) may be determined, for example, in accordance with the size of the face rectangular area, the position of the face on the original image (in this case, the order of priority is determined in accordance with the order of raster scan from upper left to lower right portions), the direction of the face (for example, whether the face is directed to the front or not), the sex or age estimated from the face and the result of face identification (i.e. whose face).

Also, the display unit 6 may be configured to display the magnification rate for magnified display. In similar fashion, the display unit 6 may be configured to indicate that normal display is going on at the time of normal display.

Also, the face detector 8 may be configured further to detect that the eyes of each face detected are open. The detection of open eyes may be realized by template matching with edges (using an open-eye template and a closed-eye template), using the aspect ratio of the eye area, the ratio of area between black and white eye areas or another other existing detection method. In such a case, the imaging apparatus 1*a* may be configured to output the detection result of the open-eye state. For example, the imaging apparatus 1*a* may be configured to display the open-eye state detection result on the display unit 6, or output the detection result using the turning on of a lamp or the voice.

Also, the face detector 8 may be configured to further detect the out-of-focus state of each face detected. The detection of the out-of-focus state can be realized by configuring the face detector 8, for example, in the manner described below.

Figure 9:
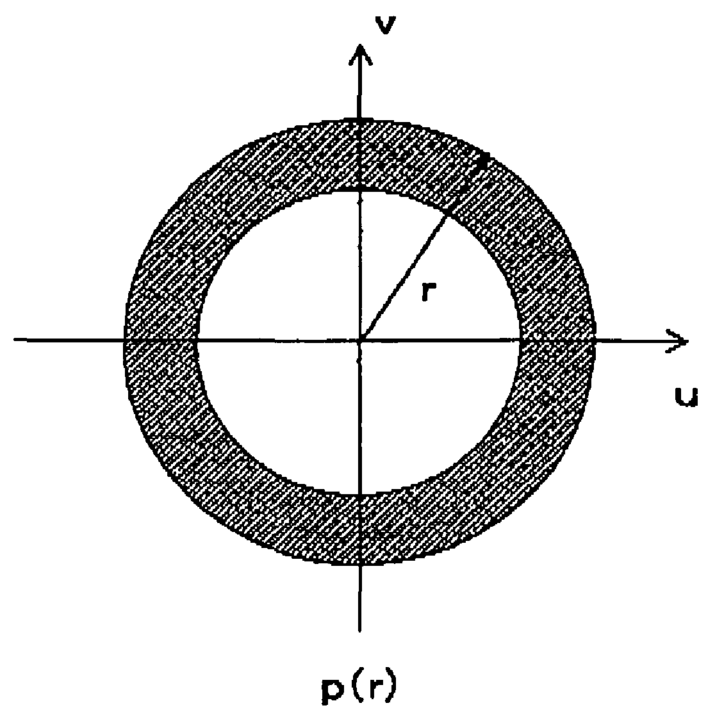
FIG. 9 shows an example of the process to determine whether the image is focused or not.

The face detector 8 converts the detected face image into the gray scale and executes the fast Fourier transform. Next, the face detector 8 detects the power spectrum, and acquires the sum of energy in a donut-shaped area with the origin of the power spectrum space as the center. FIG. 9 is a diagram showing an example of the donut-shaped area. The hatched portion in FIG. 9 is an example of the donut-shaped area. Then, in the case where the energy sum is not more than a threshold, the face detector 8 determines that the out-of-focus state prevails. The threshold can be set according to the propensity of an individual. By executing this process for the whole image as well as the face of the subject, it can be determined whether the whole image is focused or not. In this case, the imaging apparatus 1*a* may be configured to output the result of detection of the out-of-focus state. For example, the detection result of the out-of-focus state may be displayed on the display unit 6, or may be output by lighting a lamp or producing the voice.

Also, the face detector 8 may be further configured to execute the process of identifying each face. In this case, the face detector 8 identifies a detected man in accordance with the feature amounts, etc. registered in advance. In this case, the imaging apparatus 1*a* may be configured to output the identification result. For example, the imaging apparatus 1*a* may be configured to display the identification result on the display unit 6, or to output the identification result by lighting a lamp or producing the voice. This identification process can be implemented by using, for example, the technique described in the articles described below.

Kurita Takio, "Statistical Method of Face Detection and Recognition" [searched Mar. 5, 2004] Internet <URL: http://www.neurosci.aist.go.jp/-kurita/lecture/statface.pdf>

Also, the imaging apparatus 1*a* may be configured to magnify and display a part included in the face magnified and displayed on the display unit 6. In the case where an instruction to display by magnifying a part included in the face is input through the input unit 3, for example, the magnified image control apparatus 7*a* may determine the magnified display area and the magnification rate for the particular part and displayed anew on the display unit 6 in accordance with the values determined. Examples of this part include the eyes, nose, pupils, mouth, forehead and eyebrows or the surroundings thereof. This partial magnified display may be repeated. After magnified display of the face, for example, a part thereof such as the surrounding of the eyes may be magnified and displayed, and the pupils included in the eyes on display may be further displayed in magnified form as a part thereof.

Also, the magnified image control apparatus 7*a* may be configured to determine the magnified display area and the magnification rate by detecting other subjects than the face of a man. Such subjects may be, for example, an automotive vehicle or the whole human body. In such a case, an example of a part further magnified as described above is the driver's seat of the vehicle or a part of the human body (hand, leg, torso, face, etc.).

Also, the magnified image control apparatus 7*a* may receive an image not from the imaging unit 2 but may be configured to execute the process using the image already stored in the image storage unit 5 (for example, the image already picked up by the imaging unit 2). In this case, the display unit 6 may be configured to receive, magnify and display the image to be processed by the magnified image control apparatus 7*a* from the image storage unit 5.

Embodiment 2

[System Configuration]

Figure 10:
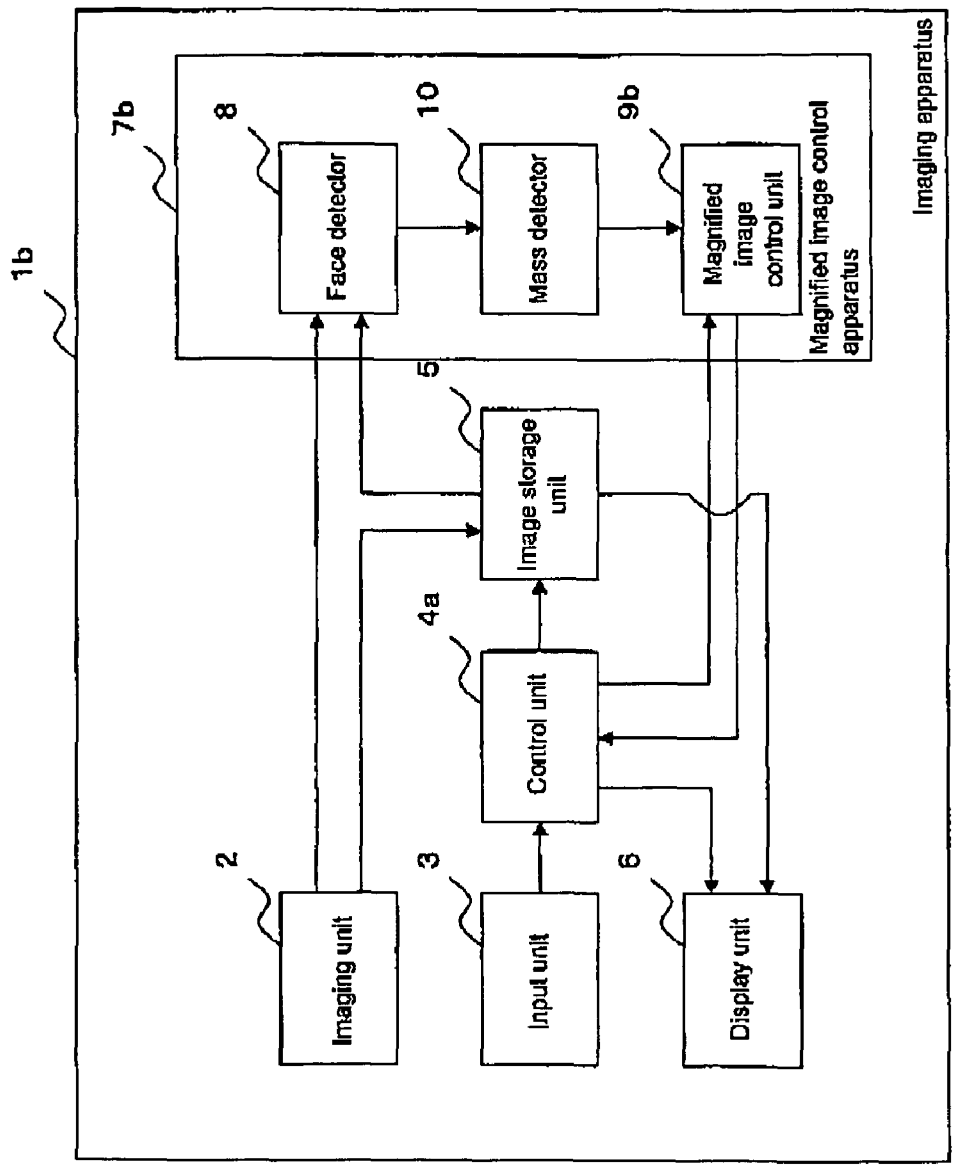
FIG. 10 shows an example of function blocks of the imaging apparatus according to the second embodiment.

Next, an imaging apparatus 1*b* having a magnified image control apparatus 7*b* as a second embodiment of the magnified image control apparatus 7 is explained. FIG. 10 is a diagram showing an example of the function blocks of the imaging apparatus 1*b*. The imaging apparatus 1*b* is different from the imaging apparatus 1*a* in that the imaging apparatus 1*b* includes the magnified image control unit 7*b* in place of the magnified image control unit 7*a*. The difference of the imaging apparatus 1*b* from the imaging apparatus 1*a* is described below.

<Magnified Image Control Apparatus>

The magnified image control apparatus 7*b*, unlike the magnified image control apparatus 7*a*, further includes a mass detector 10 and a magnified image control unit 9*b* in place of the magnified image control unit 9*a*. The difference of the magnified image control apparatus 7*b* from the magnified image control apparatus 7*a* is described below.

<<Mass Detector>>

The mass detector 10 clusters the faces detected by the face detector 8 into a plurality of masses. As the result of cluster operation by the mass detector 10, the faces included in a predetermined area of the image may be classified into the same mass, or the faces located in proximity to each other in the image may be classified into the same mass. A specific example of the process executed by the mass detector 10 is explained below.

Figure 11:
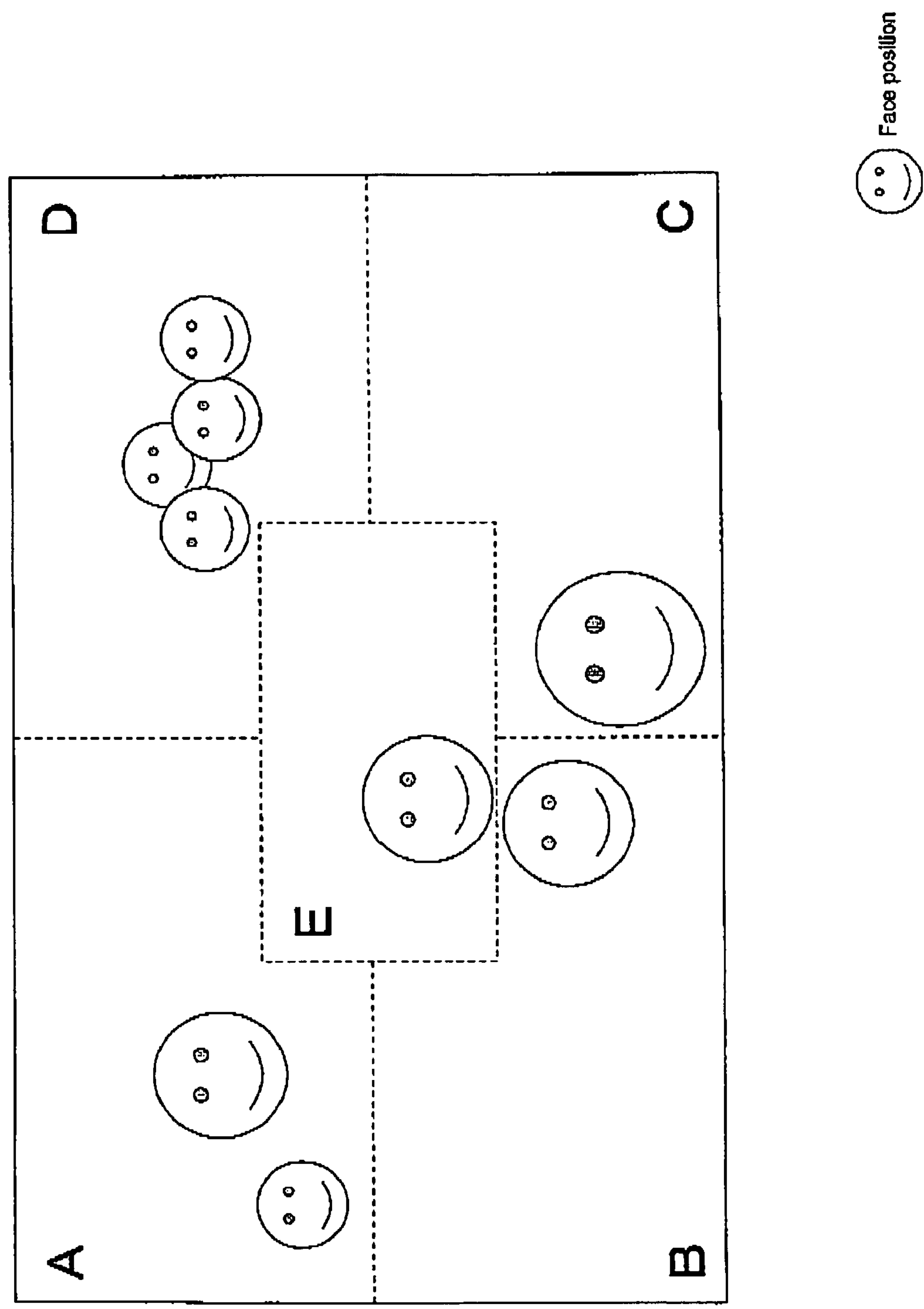
FIG. 11 shows an example of clustering in accordance with the area in the image.

FIG. 11 is a diagram showing an example of the process executed by the mass detector 10 to carry out the clustering in accordance with each area in the image. In the case where a plurality of faces exist as in FIG. 11, the mass detector 10 carries out the clustering in accordance with the position of each face. First, the mass detector 10 divides the original image into a plurality of areas (five areas A to E in FIG. 11). Next, the mass detector 10 acquires the position of each face detected. In the process, the mass detector 10 may acquire the center of gravity of the positions of the eyes and the center position of the mouth of each face as a position of the face, or the center of gravity of the skin color area, the center of the eyes or the center of the nose as the center of each face. Then, the mass detector 10 carries out the clustering by assigning each face to the area associated with the particular face.

Figure 12:
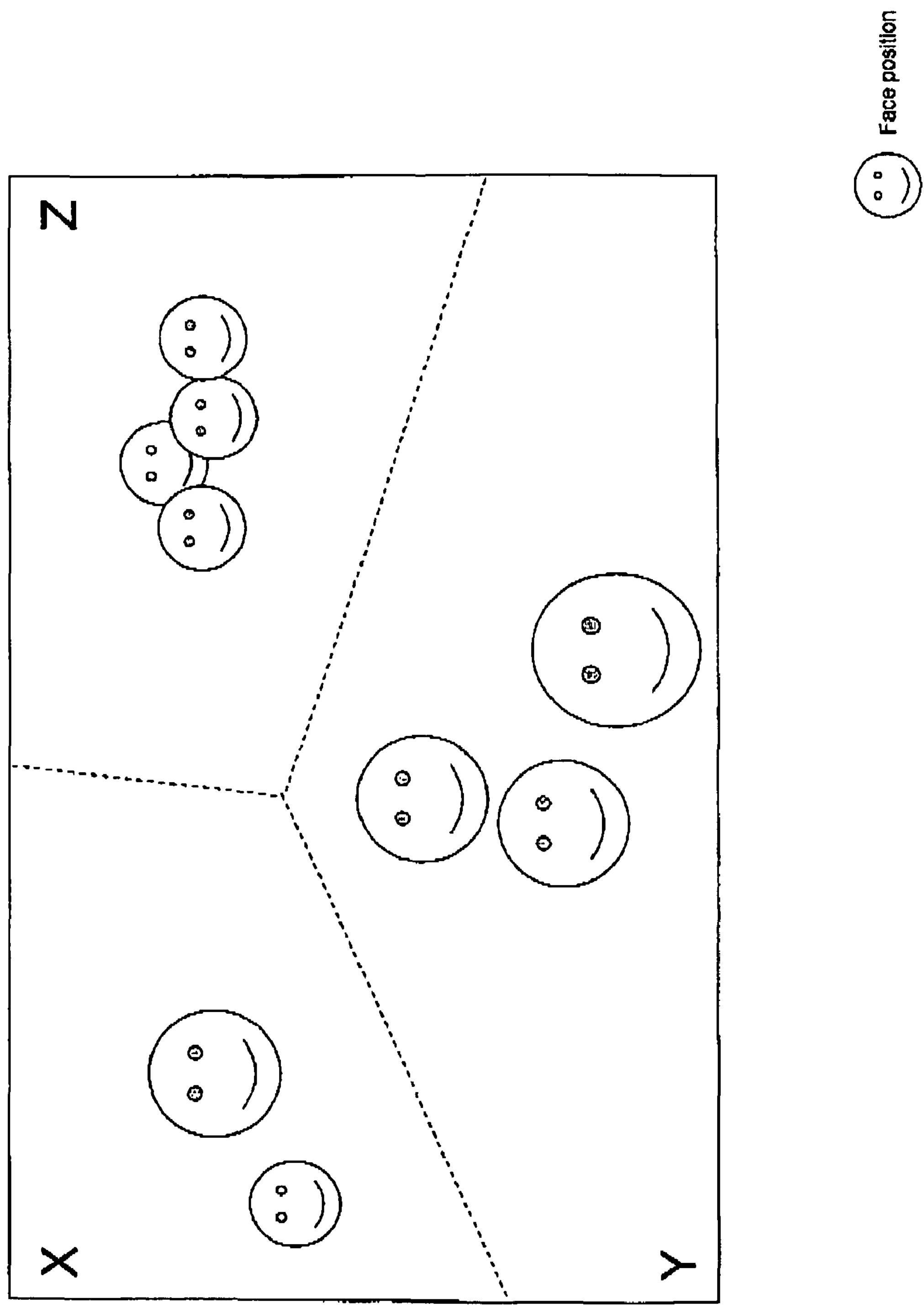
FIG. 12 shows an example of clustering in accordance with the distance of each face.

FIG. 12 is a diagram showing the process executed by the mass detector 10 to carry out the clustering in accordance with the distance of each face. In the case where a plurality of faces exist as in FIG. 12, the mass detector 10 may be configured to clustering the image into three areas (X to Z) using the nearest neighbor rule or the like.

The mass detector 10, after clustering, outputs the face information included in each mass to the magnified image control unit 9*b*.

<<Magnified Image Control Unit>>

The magnified image control unit 9*b*, unlike the magnified image control unit 9*a*, further executes the process in accordance with the result of clustering by the mass detector 10. The magnified image control unit 9*b* determines the magnified display area and the magnification rate for each mass clustered by the mass detector 10. In other words, the faces clustered into the same mass are controlled to be displayed in the display unit 6 at the same time.

Figure 13:
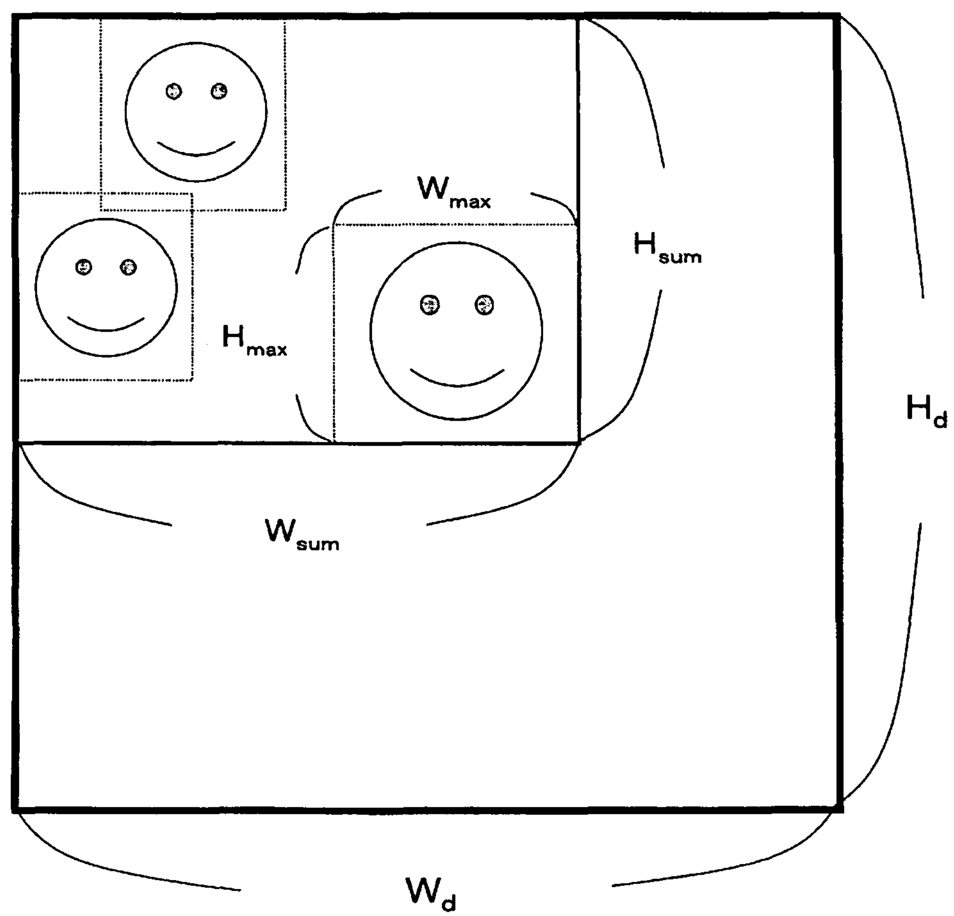
FIG. 13 shows an example of the process of a magnified image control unit according to the second embodiment.

A specific example of the process executed by the magnified image control unit 9*b* is explained with reference to FIG. 13. FIG. 13 is a diagram showing an example of the process executed by the magnified image control unit 9*b*. In FIG. 13, Wd, Hd designate the width and height, respectively, of the display area of the display unit 6. Also, Wsum, Hsum designate the width and height, respectively, of the rectangle circumscribed about the face rectangular face of all the faces included in the same mass. Also, Wmax, Hmax designate the width and height, respectively, of the face rectangular area having the largest area of all the face rectangular areas of the faces included in the same mass.

The magnified image control unit 9*b* first acquires the face rectangular area of each face included in the mass to be processed. The magnified image control unit 9*b* may acquire the face rectangular area by the same method as the magnified image control unit 9*a*. Next, the magnified image control unit 9*b* acquires Wsum and Hsum and determines these values as the magnified display area. Next, the magnified image control unit 9*b* calculates aw=Wd/Wsum and ah=Hd/Hsum. Then, the magnified image control unit 9*b* acquires a magnification rate from aw or ah, whichever is smaller in value. The magnified image control unit 9*b* may output the magnified display area and the magnification rate thus obtained to the control unit 4*a*.

Also, the magnified image control unit 9*b* may be configured to further execute the process described below. The magnified image control unit 9*b* determines the area specified by Wsum and Hsum as a provisional magnified display area and acquires aw or ah, whichever is smaller in value, as a provisional magnification rate. Next, in the case where the provisional magnified display area is magnified by the provisional magnification rate, the magnified image control unit 9*a* determines whether the image of the face included in the particular area is sufficiently large or not. The magnified image control unit 9*b*, upon determination that the face image has no sufficient display size, divides the provisional magnified display area into a plurality of areas and determines each area thus divided as a magnified display area. In this way, the display of the face image of a sufficiently large size is guaranteed. A specific example of this process is explained below.

With this configuration, first, the magnified image control unit 9*b* defines aw or ah, whichever smaller, as a provisional magnification rate, and acquires the largest face rectangular area in the mass (i.e. the face rectangular area defined by Wmax and Hmax) magnified by the provisional magnification rate as Smax. Specifically, the magnified image control unit 9*b* calculates the value of Smax according to the following equation:

$$S_{max}=W_{max}\times H_{max}\times \min(aw,ah)^2 \quad \text{[Expression 4]}$$

Incidentally, in Expression 4, min(aw, ah) indicates the value of the smaller one of aw and ah. The magnified image control unit 9*b* compares the value $S_{max}$ with a predetermined threshold A. In the case where the value $S_{max}$ is not less than the threshold A, the magnified image control unit 9*b* determines the area specified by Wsum, Hsum as a magnified display area and outputs the value of min(aw, ah) as a magnification rate. In the case where the value $S_{max}$ is smaller than the threshold A, on the other hand, the magnified image control unit 9*b* divides the area specified by Wsum, Hsum into a plurality of areas, and specifies each of the divided areas as a magnified display area.

Figure 14:
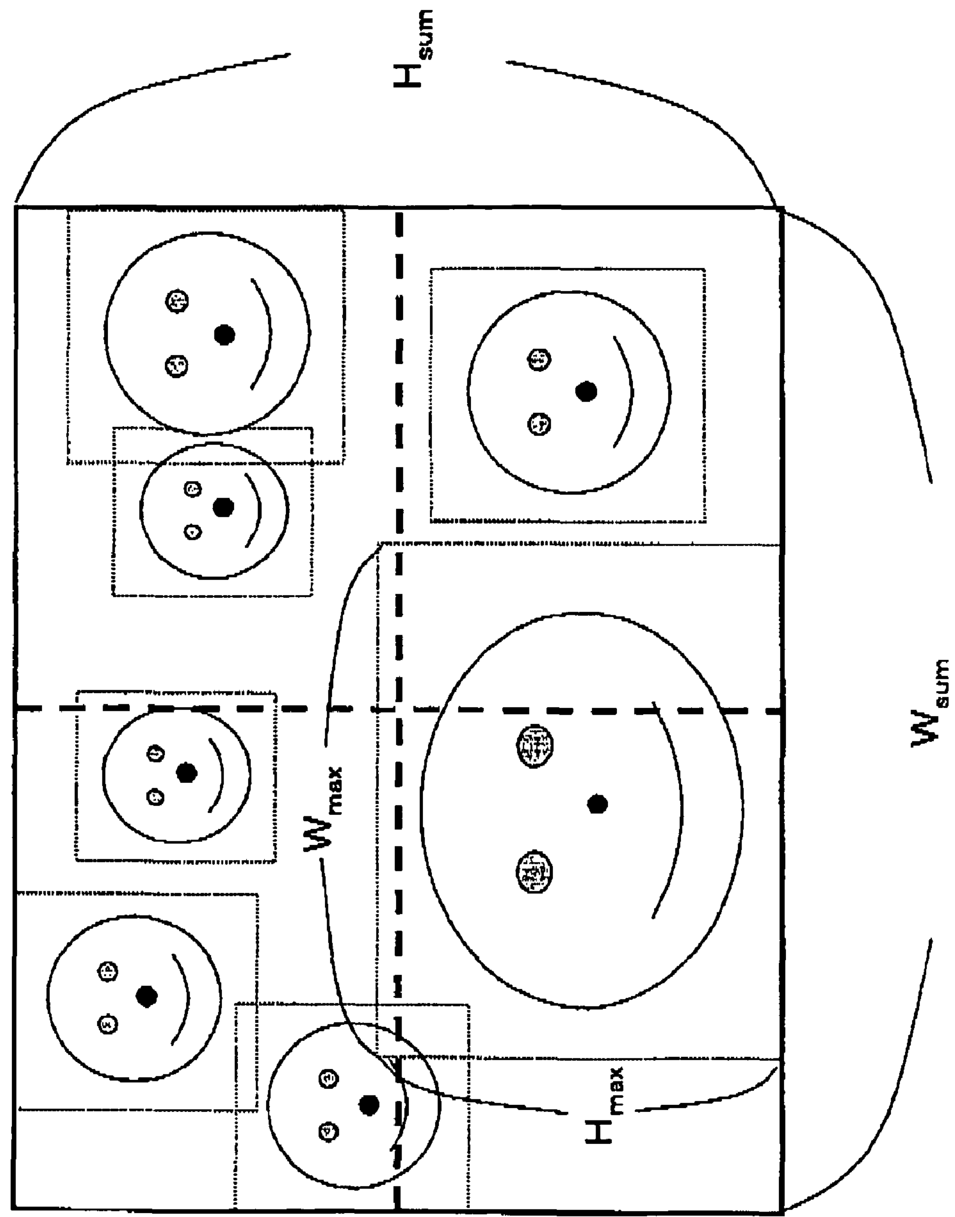
FIG. 14 shows an example of the area dividing process executed by the magnified image control unit according to the second embodiment.

Next, an example of the area-dividing process executed by the magnified image control unit 9*b* is explained. FIG. 14 is a diagram showing an example of the area-dividing process executed by the magnified image control unit 9*b*. In FIG. 14, the black dot included in each face indicates the center of gravity of the eyes and the mouth center and a point acquired as the center of each face. The magnified image control unit 9*b* acquires the magnification rate Emin (hereinafter referred to as "the minimum magnification rate") to set the size of the largest face rectangular area in the mass as a threshold A. The minimum magnification rate Emin is given by, for example, Expression 5 below.

$$E_{min}=\sqrt{\frac{A}{W_{max}\times H_{max}}} \quad \text{[Expression 5]}$$

Next, the magnified image control unit 9*b*, upon execution of the magnification process using the minimum magnification rate Emin, specifies a plurality of division areas having a sufficient size to be accommodated in the display frame of the display unit 6. For example, the magnified image control unit 9*b* specifies a plurality of division areas by executing the process described below. First, the figures below the decimal point of $DIV_w$ and $DIV_h$ calculated by Expression 6 are carried up and the resulting integer is used as a division number along the width and height, respectively.

$$DIV_w=\frac{W_d}{W_{sum}\times E_{min}} \quad \text{[Expression 6]}$$

$$DIV_h=\frac{H_d}{H_{sum}\times E_{min}}.$$

The magnified image control unit 9*b*, in accordance with the resulting division number, divides the area specified by $W_{sum}$, $H_{sum}$ into a plurality of areas. FIG. 14 shows an example in which the specified area is divided into the division number 2 equally along the width and height (divided by thick dashed lines).

Figure 15:
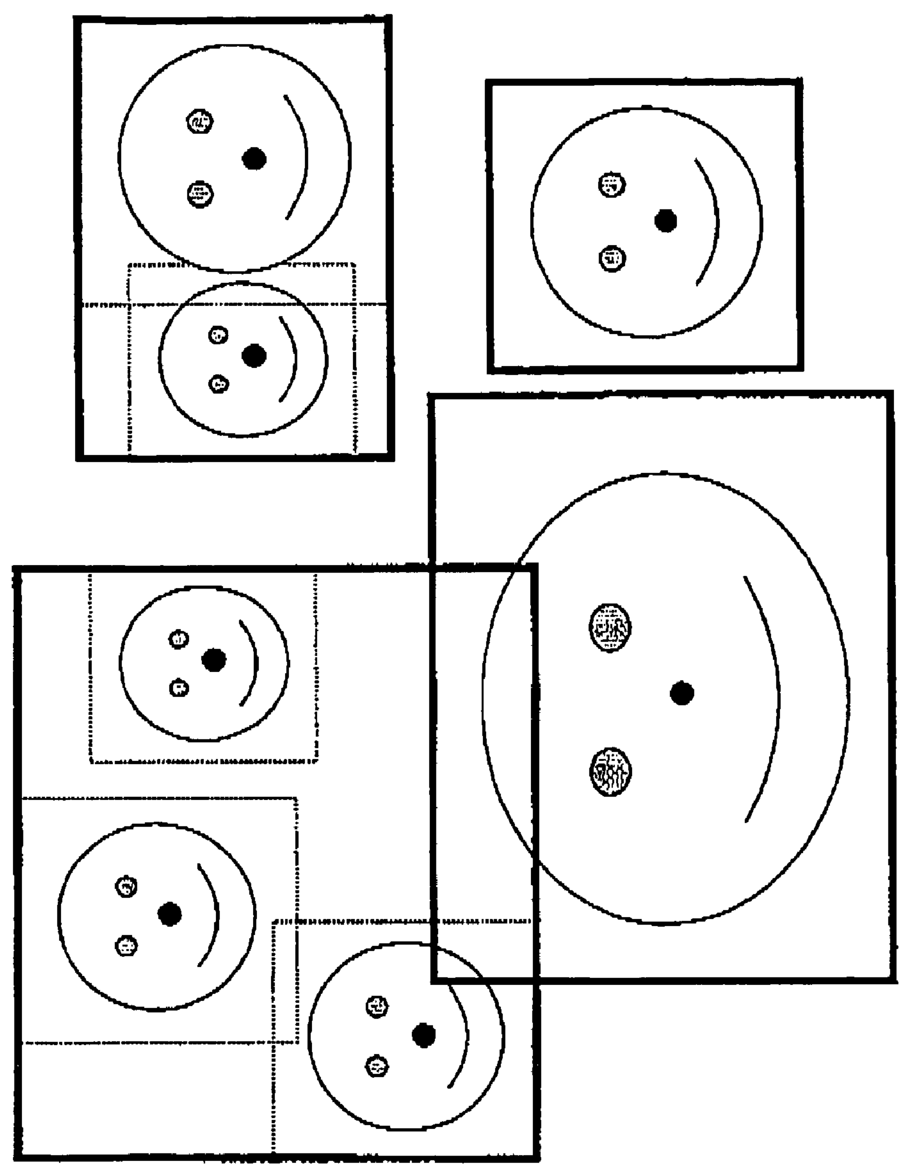
FIG. 15 shows an example of the magnified display area divided.

Next, the magnified image control unit 9*b* classifies the faces having the center thereof in the same area divided are classified as faces associated with the same mass. Based on the face rectangular areas associated with each mass, the magnified display area for each mass is specified. FIG. 15 is a diagram showing an example of the magnified display area for each mass classified in FIG. 14. In FIG. 15, the magnified display area for each mass is indicated by a thick rectangle. The magnification rate of the magnified display areas specified in this way may be unified as Emin or may be calculated anew in accordance with each magnified display area.

[Operation Example]

FIG. 16 is a flowchart showing an example of operation of the imaging apparatus 1*b*. Incidentally, the steps similar to those (i.e. the process of the imaging apparatus 1*a*) shown in FIG. 5 are designated by the same reference numerals in FIG. 16 as in FIG. 5 and not explained again.

In the case where no face is detected by the face detecting operation at step S02 (0 at S16), the normal display is carried out (S04). Also, in the case where only one face is detected in the face detecting operation (1 at S16), the process of determining the magnified display area for this face is executed (S05), and the face is magnified and displayed (S06). Also, in the case where a plurality of faces are detected at the face detection step S02 (S16>=2), the mass detector 10 executes the clustering operation (S17). Then, the magnified image control unit 9*b* executes the process of determining the mass magnified display area for each mass specified by the mass detector 10 (S18).

Figure 17:
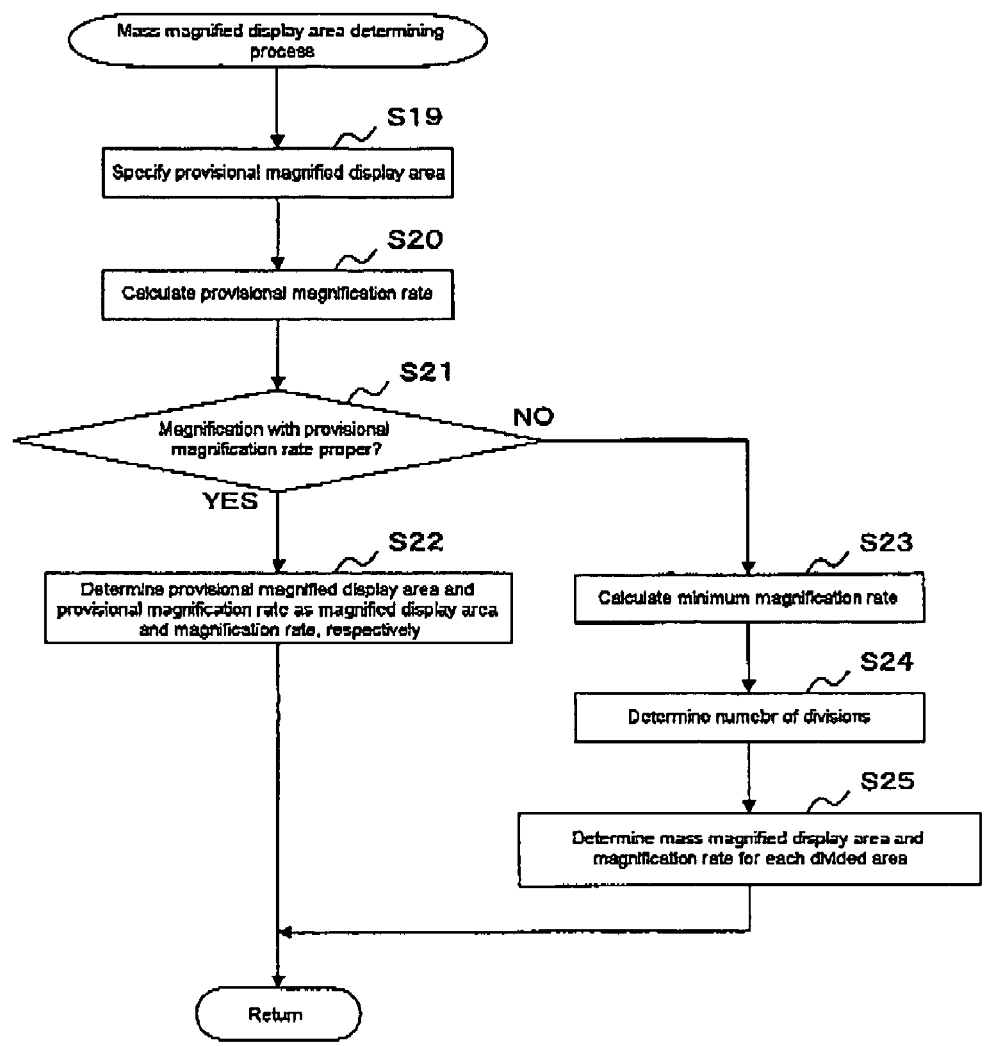
FIG. 17 shows a flowchart of an example of operation for the process of determining the mass magnified display area.

FIG. 17 is a flowchart showing an example of the process of determining the mass magnified display area. Once this process is started, the magnified image control unit 9*b* specifies the provisional magnified display area by acquiring Wsum, Hsum (S19). Next, the magnified image control unit 9*b* calculates the provisional magnification rate based on the specified provisional magnified display area and the display areas Wd, Hd of the display unit 6 (S20). Then, the magnified image control unit 9*b* determines whether the magnification with the calculated provisional magnification rate is proper or not. In the case where the magnified image control unit 9*b* determines it proper (YES at S21), the provisional magnified display area and the provisional magnification rate are determined as a magnified display area and a magnification rate, respectively (S22), and these values are output thereby to end the process of determining the mass magnified display area.

In the case where the magnified image control unit 9*b* determines that the magnification process with the provisional magnification rate is not proper (NO at S21), on the other hand, the minimum magnification rate is calculated as the magnitude of a minimum required magnification rate to execute the proper magnification process (S23). Next, the magnified image control unit 9*b* determines the number of divisions into which the provisional magnified display area is divided in accordance with the minimum magnification rate calculated (S24). Then, the magnified display area and the magnification rate are specified in accordance with the faces included in each division area of the provisional magnified display area divided (S25). By outputting these values, the process of determining the mass magnified display area is ended.

Returning to FIG. 16, an example of the process executed by the imaging apparatus 1*b* is explained. At the end of the process of determining the mass magnified display area, the control unit 4*b* instructs the display unit 6 to magnify and display the image in accordance with the output from the magnified image control unit 9*b*, and the display unit 6 magnifies and displays the image in compliance with the instruction (S06). Like the imaging apparatus 1*a*, the magnified display corresponding to the user input is executed (S07 to S09).

[Operation/Effects]

In the imaging apparatus 1*b*, the faces of men imaged in proximity to each other on the original image or in the same area (such as the areas A to E in FIG. 11) are detected as a mass. Upon detection of a mass, the face of each man is not magnified and displayed, but the faces of the men included in each mass are magnified and displayed at the same time. In the case where the faces of a plurality of men are included in the original image, therefore, it is not necessary to confirm an image magnified and displayed for the face of each man to magnify and display the image of a new man. Specifically, the simultaneous confirmation of the faces of a plurality of men makes possible an efficient job of confirming the image of each man constituting an intended subject.

Also, in the case where the faces of men arranged in a long row or column are clustered as a mass, the value of aw or ah, whichever is smaller, obtained as a magnification rate is liable to be very small. In such a case, even though the faces included in a mass are magnified and displayed at the same time, a sufficient magnification (i.e. the proper magnification process) is impossible and it may be difficult to effectively confirm the image. In the imaging apparatus 1*b*, therefore, the magnified image control unit 9*b* determines whether the proper magnification process is executed or not with the magnification rate provisionally obtained (provisional magnification rate). In the case where the magnified image control unit 9*b* determines that the proper magnification process cannot be executed, the provisional magnified display area is further divided into a plurality of magnified display areas. In this way, a magnification rate higher than the provisional magnification rate is secured to guarantee the proper magnification process. As a result, the user confirming the image can view the image sufficiently magnified, and conduct the confirmation job effectively.

[Modification]

The magnified image control unit 9*b* may be configured to request the mass detector 10 to cluster again the area specified by Wsum, Hsum in the process of area division. In this case, the mass detector 10 executes the clustering described above and specifies a mass of a plurality of faces for the area specified by Wsum, Hsum. Then, the magnified image control unit 9*b* calculates Wsum, Hsum anew based on the result of reclustering by the mass detector 10. In this way, the magnified display area is specified and further the magnification rate is calculated. The magnified image control unit 9*b* may be configured to recursively execute this process until the conditions of the threshold A are satisfied.

Also, the magnified image control unit 9*b* may be configured to assign the order of priority of display in outputting a plurality of magnified display areas and magnification rates. For example, the order of priority of display (i.e. the sequence of display) may be determined in accordance with the number of faces included in a mass, the maximum size of the face rectangular area included in the mass, the total size of the faces or the face rectangular areas included in the mass, the sequence predetermined for each area (A, B, C and D in that order, for example), the number of faces directed forward, the number of faces by sex, the number of faces by age or the result of identification of the faces included in the mass (i.e. whose faces are included).

Also, the number of the faces included in a mass may be controlled. In the case where the user designates the number of faces, for example, the mass detector 10 executes the clustering process in such a manner that more faces than the designated number are not included in a mass. In the case where more faces than designated are included in a mass as the result of clustering, for example, the clustering is recursively executed for the particular mass.

Also, in the case where a plurality of faces are displayed as a mass at the same time, a face on display may be selected and only the particular face may be further magnified and displayed. In this case, the process of determining the face magnified display area is executed for the face selected by the user, for example, thereby determining the magnified display area and the magnification rate unique to the particular face. In accordance with the contents thus determined, a face is displayed on the display unit 6.

Also, the imaging apparatus 1*b* according to the second embodiment may be configured in accordance with a modification of the first embodiment.

Embodiment 3

[System Configuration]

Figure 18:
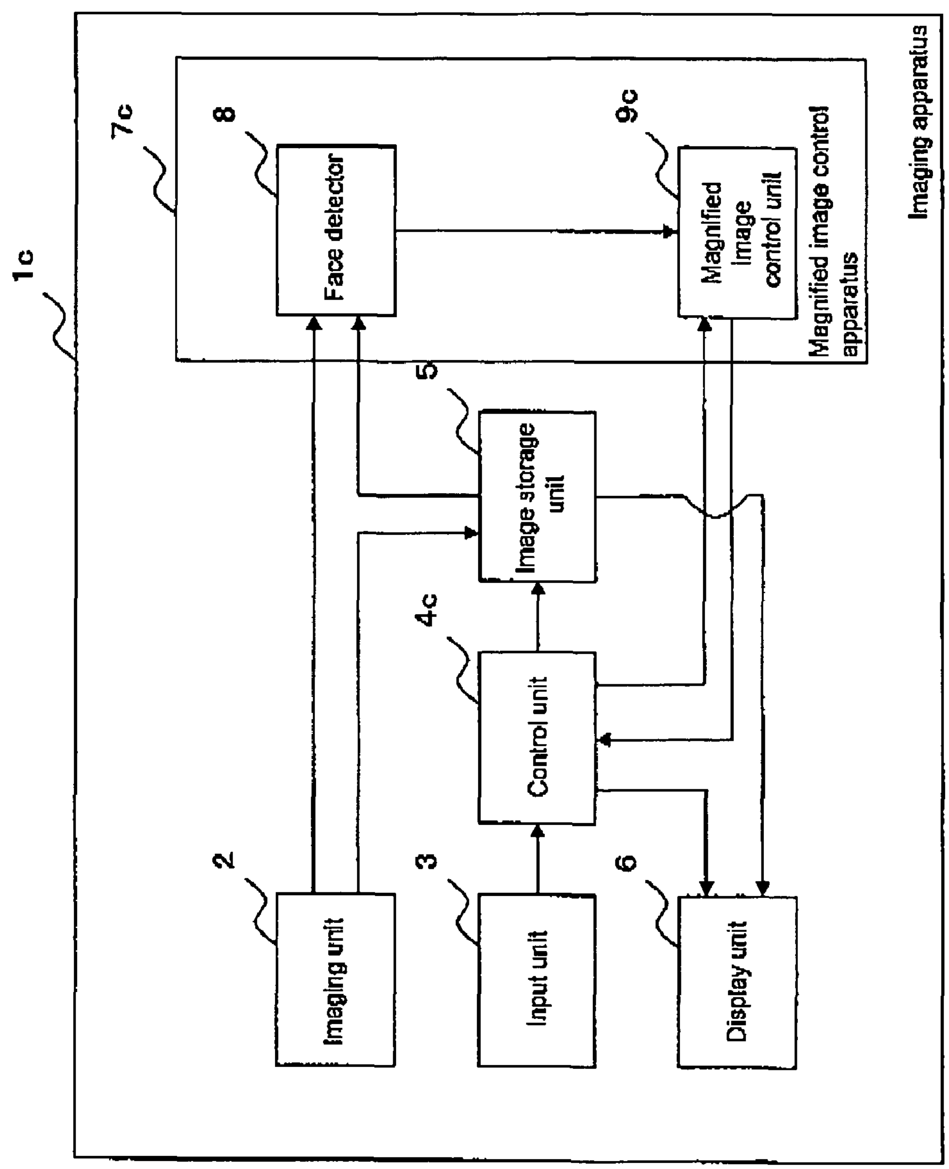
FIG. 18 shows an example of the function blocks of the imaging apparatus according to a third embodiment.

Next, an imaging apparatus 1*c* having a magnified image control apparatus 7*c* according to a third embodiment based on the magnified image control apparatus 7 is explained. FIG. 18 is a diagram showing an example of the function blocks of the imaging apparatus 1*c*. The imaging apparatus 1*c* is different from the imaging apparatus 1*a* in that the imaging apparatus 1*c* includes a control unit 4*c* in place of the control unit 4a and the magnified image control apparatus 7c in place of the magnified image control apparatus 7a. The difference of the imaging apparatus 1c from the imaging apparatus 1a is described below.

<Magnified Image Control Apparatus>

The magnified image control apparatus 7c, unlike the magnified image control apparatus 7a, includes a magnified image control unit 9c in place of the magnified image control unit 9a. The difference of the magnified image control apparatus 7c from the magnified image control apparatus 7a is explained below.

<<Magnified Image Control Unit>>

The magnified image control unit 9c is different from the magnified image control unit 9a in that the former generates a whole image and determines the magnified display area and the magnification rate in such a manner as to make it possible to display the whole image. The whole image is defined as an image showing the whole of the original images and implemented as an image reduced from the original image or an image including the figures indicating the position and size of the faces detected in the original image. The magnified image control unit 9c determines the magnified display area and the magnification rate in such a manner as not to reduce the visibility of the face image as an intended subject in the magnified image when displaying the whole image on the display unit 6. Three types of specific processes executed by the magnified image control unit 9c are explained below.

Figure 19:
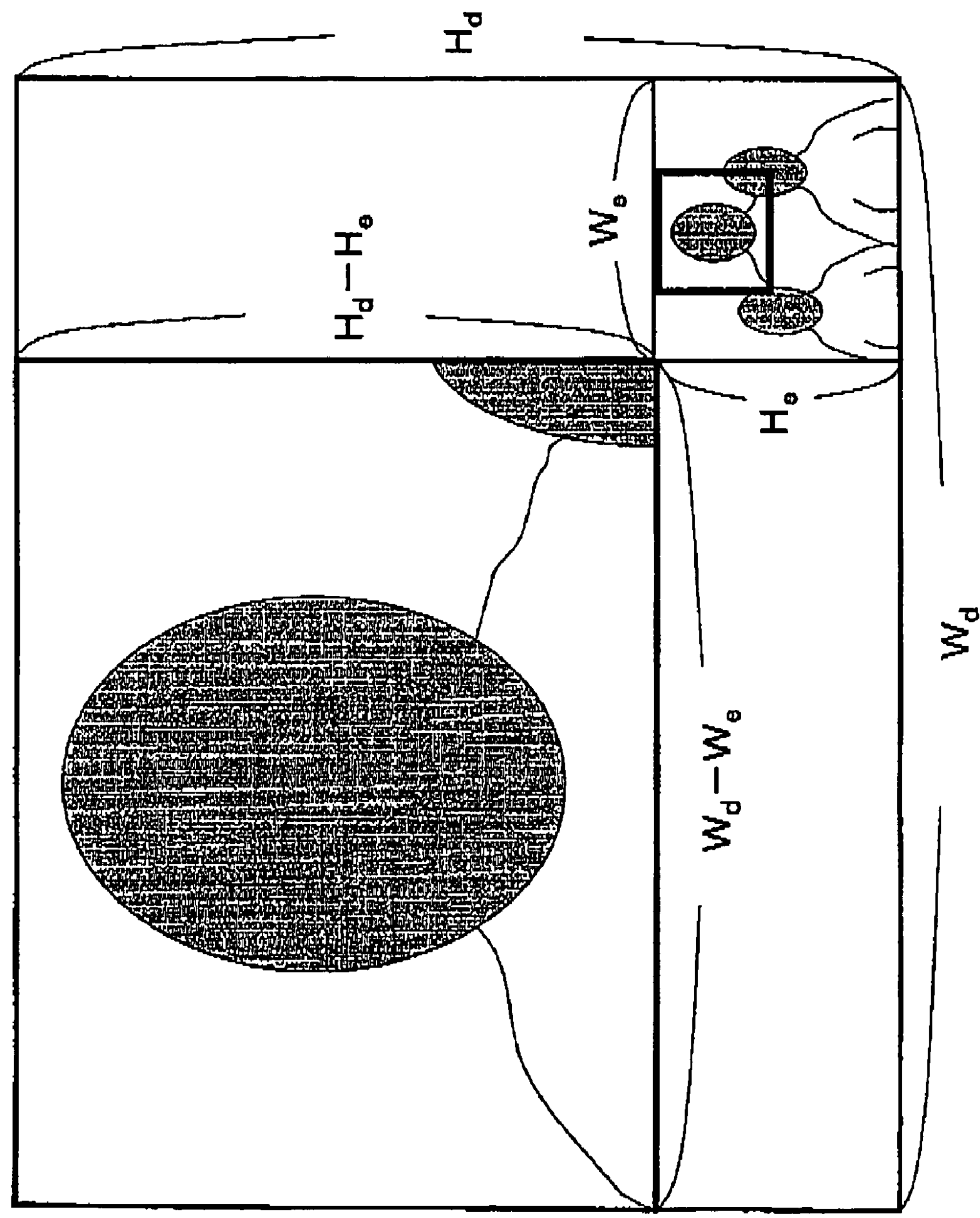
FIG. 19 shows an example of display in the display unit according to the third embodiment.

FIG. 19 is a diagram showing an example of display corresponding to a first example of the process of all the examples of display on the display 6 on which the whole image is displayed. In the first example of the process, the whole image is displayed and therefore the display frame for magnified display is set correspondingly smaller. The imaging apparatuses 1a, 1b determine the magnified display area and the magnification rate in accordance with the display frame (Wd, Hd) of the display unit 6. In the first example of the process of the imaging apparatus 1c, however, in the case where the display frame of the whole image is set as We, He, the display frame for magnified display is defined as Wd-We, Hd-He. Thus, the process of determining the face magnified display area is executed in accordance with the display frame defined as Wd-We, Hd-He thereby to determine the magnified display area and the magnification rate.

Figure 20:
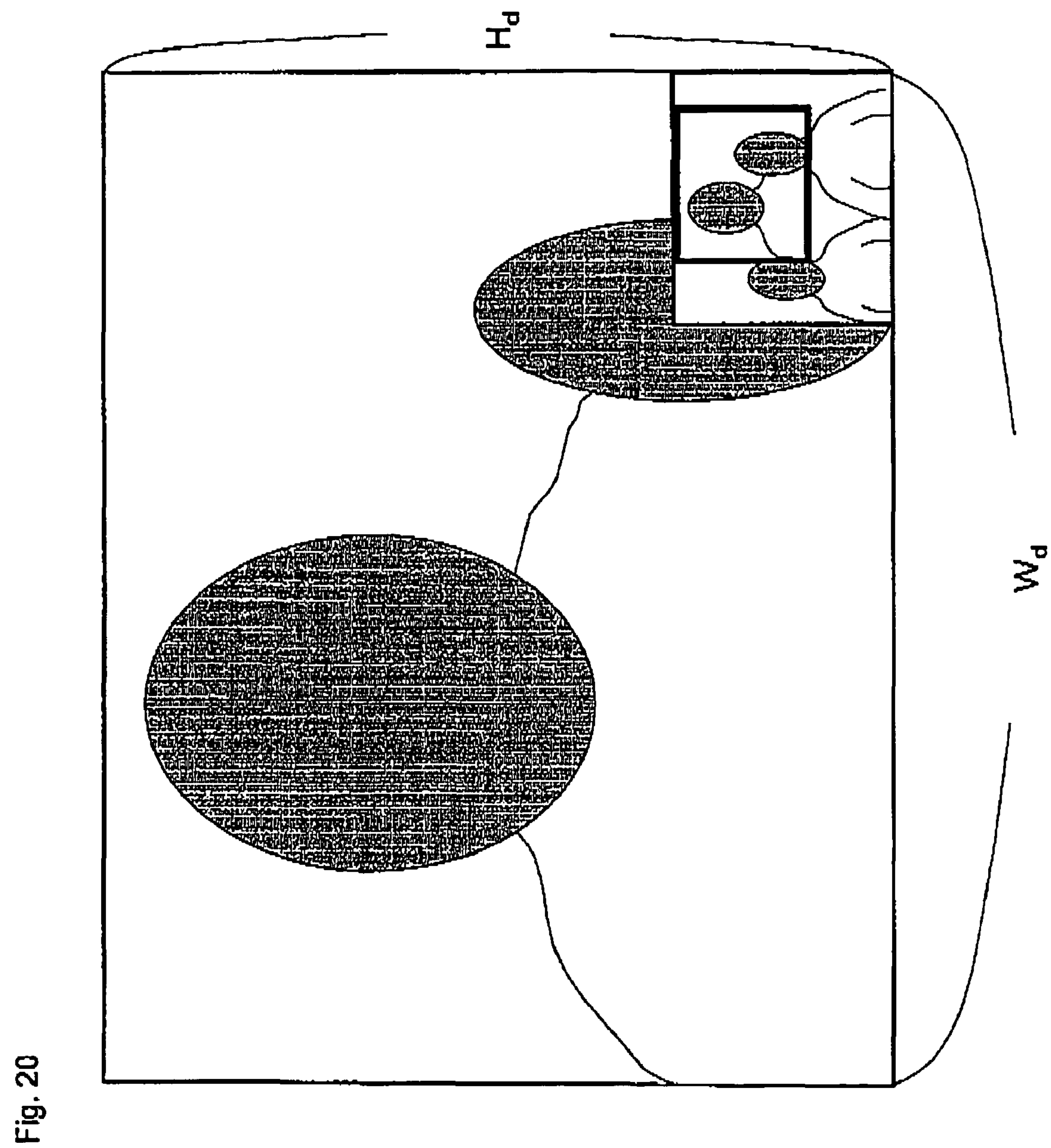
FIG. 20 shows an example of display in the display unit according to the third embodiment.

FIG. 20 is a diagram showing an example of display corresponding to the second example of the process among all the display examples for the display unit 6 to display the whole image. In the third example of the process, the display frame for magnified display is not small, and in accordance with the same size (Wd, Hd) as the display frame of the display unit 6, the magnified display area and the magnification rate are determined. In the second example of the process, however, the magnified display area is determined displaced in a given direction to secure the area for displaying the whole image. Specifically, the magnified image control unit 9c, after determining the magnified display area by the same process as the magnified image control unit 9a, determines the final magnified display area by displacing the magnified display area vertically or horizontally or in the direction toward the position for displaying the whole image. The amount of displacement may be determined based on We, He representing the display frame of the whole image. In the case of FIG. 20, for example, the whole image is displayed toward the lower right portion, and therefore the magnified display area is displaced toward the lower right portion.

Figure 21:
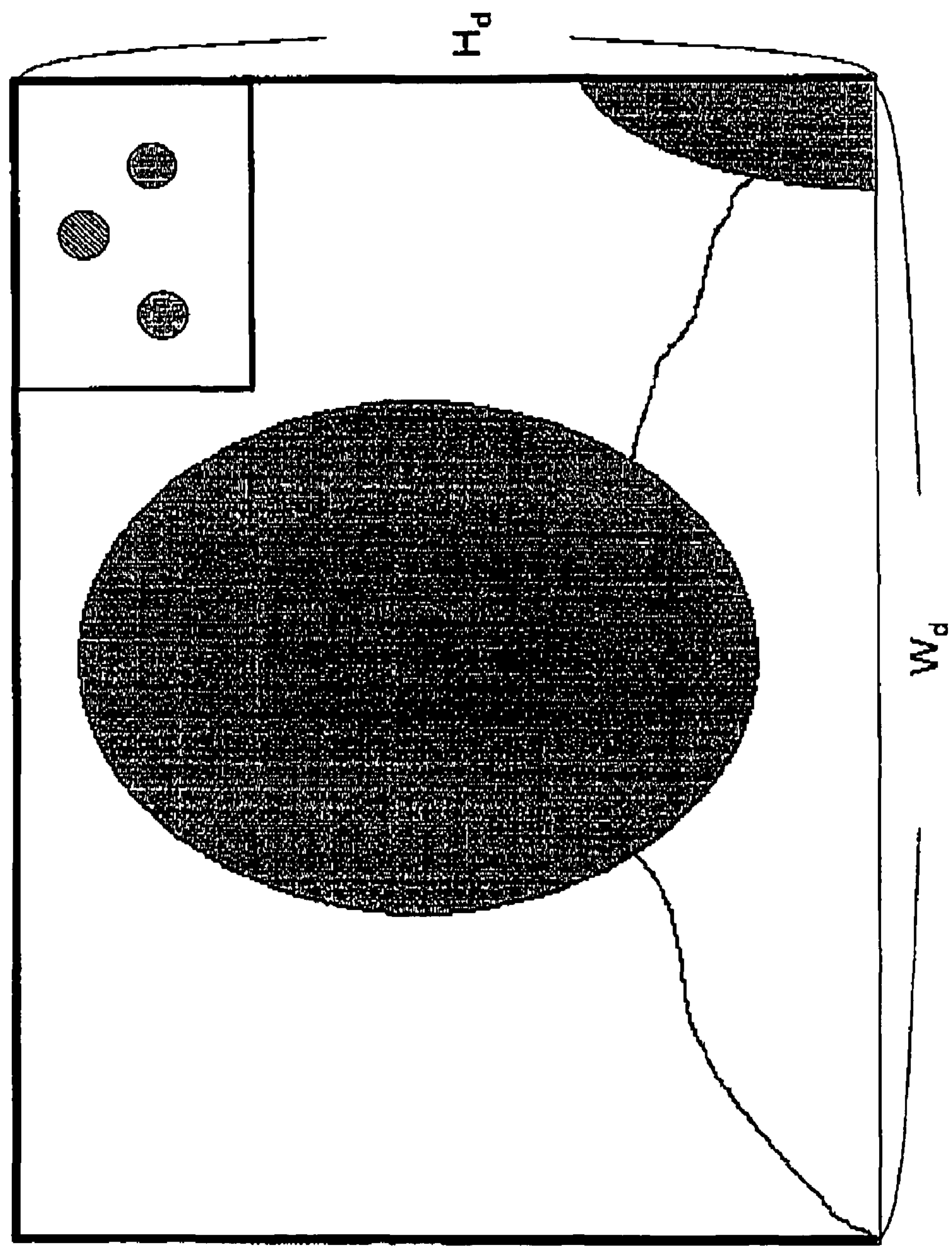
FIG. 21 shows an example of display in the display unit according to the third embodiment.

FIG. 21 is a diagram showing, of all the display examples in the display unit 6 displaying the whole image, an example of display corresponding to a third example of process. In the third example of process, the display frame of magnified display is not set small, and the magnified display area and the magnification rate are set in accordance with the same size (Wd, Hd) as the display frame of the display unit 6.

<Control Unit>

The control unit 4c determines by control as to which one of the first to third examples of process is executed by the magnified image control apparatus 7c in accordance with the setting stored or input by the user.

In the case where the process shown in the first example of process is executed by the magnified image control apparatus 7c, the control unit 4c controls the display unit 6 in such a manner as to display a reduced original image as the whole image. Also, in the process, the control unit 4c may control the display unit 6 in such a manner that the frame indicated by the magnified display area is displayed in the whole image (in such a manner as to be displayed in a thick frame, for example). Also, the control unit 4c may control the display unit 6 in such a manner that a particular face of a man displayed in magnified form is displayed in the whole image (in such a manner as to display the face as a thick circular frame, for example). Also, in the case where the process shown as the first example of process is executed in the magnified image control apparatus 7c, the control unit 4c controls the magnified image control apparatus 7c in such a manner that the process of determining the face magnified display area is executed in accordance with the display frame defined as Wd-We, Hd-He.

In the case where the process shown in the second example of process is executed by the magnified image control apparatus 7c, the control unit 4c controls the display unit 6 in such a manner as to display a similar image to the first example of process as the whole image. In the process, the control unit 4c controls the display unit 6 by superposing the whole image on the magnified image at a predetermined position (lower right corner in FIG. 20) of the display frame.

In the case where the process shown in the third example of process is executed by the magnified image control apparatus 7c, the control unit 4c controls the display unit 6 in such a manner that the reduced original image is not displayed as the whole image, but a geometric figure indicating the position and size of the face detected by the face detector 8 is displayed. In the process, the control unit 4c may control the display unit 6 in such a manner that the geometric figure indicating the face displayed in magnified form as a magnified display area is displayed in a manner identifiable from other geometric figures. For example, such a geometric figure may be displayed with a pattern, shape or color different from other geometric figures, or may be configured to further display a frame surrounding such as geometric figure. Further, the geometric figure and the frame may be displayed translucently.

[operation/Effects]

In the imaging apparatus 1c, in addition to the magnified display with the face of a man displayed in magnified form, the whole image whereby the whole configuration of the original image is recognizable is displayed on the display unit 6. Also, the position and size of the face of the man displayed in magnified form is displayed in the whole image. The user, therefore, can easily grasp which part of the original image constitutes the face displayed magnified or to what degree the face image is magnified.

Also, since the whole image is displayed in a small display frame, the user may be unable to confirm the whole configuration simply by displaying the reduced original image. In the third example of process of the imaging apparatus 1*c*, however, the original image is not displayed as the whole image, but a geometric figure showing a face is displayed. As a result, the whole image can be displayed as a more simple image, and it becomes easy to grasp the whole configuration (the arrangement and size of each face imaged).

[Modification]

The magnified image control apparatus 7*c* further includes a mass detector 10 according to the second embodiment, and the magnified image control unit 9*c*, like the magnified image control unit 9*b* according to the second embodiment, may be configured to further operate in accordance with the output of the mass detector 10. In other words, the imaging apparatus 1*c*, like the imaging apparatus 1*b* according to the second embodiment, may be configured to handle a plurality of faces as a single mass.

Also, the control unit 4*c* may control the display unit 6 in such a manner that the faces magnified and displayed and the mass can be selected from the whole image displayed. For example, the display unit 6 may be controlled in such a manner that in the whole image, the face or the mass selected by the user is displayed in a manner discriminable from other faces and masses, and the selected face and mass are changed in accordance with the input operation of the user through the input unit 3.

Also, the control unit 4*c* may be configured to determined by control, through the input operation of the user by way of the input unit 3, as to whether the whole image is displayed or not.

Also, in the case where the magnified display is conducted in accordance with the first or second example of process, the display using a geometric figure may be conducted in accordance with the third example of process as the whole image. Also, in the case where the magnified display is conducted in accordance with the third example of process, the reduced original image may be displayed in accordance with the first or second example of process.

Also, the imaging apparatus 1*c* according to the third embodiment may be configured in accordance with a modification of the first or second embodiment.

What is claimed is:

1. A magnified display apparatus comprising:

a display device to display an image;

a detection device to detect the respective positions of a plurality of intended subjects within an original image, the original image being one of an image to be displayed and an image on display on the display device;

a display area determining device to determine a magnified display area for magnified display of each of the intended subjects based on the respective positions of intended subjects within the original image as detected by the detection device;

a magnification rate determining device to determine a magnification rate of each magnified display area determined by said display area determining device based on a size of the determined magnified display areas and a size of a screen displayed by the display device; and a magnified image control device for determining magnification information for each intended subject and outputting the magnification information as a set for all of the intended subjects, the magnification information for each intended subject comprising the magnified display area for the intended subject determined by the display area determining device and the magnification rate of the corresponding magnified display area determined by the magnification rate determining device;

wherein the display device displays an image in the magnified display area determined by the display area determining device in accordance with the magnification rate determined by the magnification rate determining device, wherein the display device displays on the screen an image of one of the intended subjects with the magnified display area and magnification rate determined by the output of the magnified image control device, said apparatus further comprising a classification device to classify the plurality of intended subjects determined by the detection device, into a plurality of masses, wherein the display area determining device determines the magnified display area based on positions of all the intended subjects classified into the same mass by the classification device.

2. A magnified display apparatus according to claim 1, further comprising:

an evaluation device to evaluate whether the intended subject included in the magnified display area determined by the display area determining device can be magnified sufficiently by displaying the magnified display area with the magnification rate determined by the magnification rate determining device; and a reclassification device to classify a plurality of the intended subjects included in the magnified display area into a plurality of masses in the case where the evaluation device evaluates that the intended subject is not sufficiently magnified;

wherein the magnified display area is determined based on the positions of all the intended subjects classified into the same mass by the reclassification device in the case where the intended subjects are classified by the reclassification device.

3. A magnified image control apparatus comprising:

a detection device to detect the respective positions of a plurality of intended subjects within an original image, the original image being a selected one of an image to be displayed and an image on display on a screen;

a display area determining device to determine a magnified display area for magnifying and displaying each of the intended subjects detected by the detection device, based on a respective position of the respective intended subjects within the original image;

a magnification rate determining device to determine a magnification rate of the magnified display area determined by said display area determining device based on a size of the determined magnified display area and a size of the screen; and a magnified image control device for determining magnification information for each intended subject and outputting the magnification information as a set for all of the intended subjects, the magnification information for each intended subject comprising the magnified display area for the intended subject determined by the magnified display area determining device and the magnification rate of the corresponding magnified display area determined by the magnification rate determining device, said apparatus further comprising a classification device to classify the plurality of intended subjects detected by the detection device, into a plurality of masses, wherein the display area determining device determines the magnified display area based on positions of all the intended subjects classified into the same mass by the classification device.

4. A magnified image control apparatus according to claim 3, further comprising:

an evaluation device to display the magnified display area, and evaluate whether the intended subject included in the display area is displayed in a form sufficiently magnified; and a reclassification device to classify the intended subjects included in the magnified display area into a plurality of masses in the case where the evaluation device evaluates that the intended subject is not sufficiently magnified;

wherein the magnified display area is determined based on the positions of all the intended subjects classified into the same mass by the reclassification device in the case where the intended subjects are classified by the reclassification device.

* * * * *